(12) United States Patent
Sun et al.

(10) Patent No.: US 11,894,909 B2
(45) Date of Patent: Feb. 6, 2024

(54) SENSOR ASSISTED BEAM TRACKING

(71) Applicant: Apple Inc., Cupertino, CA (US)

(72) Inventors: Yakun Sun, San Jose, CA (US); Rohit U. Nabar, Sunnyvale, CA (US); Mithat C. Dogan, San Jose, CA (US); Parvathanathan Subrahmanya, Sunnyvale, CA (US); Han Yan, Cupertino, CA (US); Louay Jalloul, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/878,863

(22) Filed: Aug. 1, 2022

(65) Prior Publication Data
US 2023/0080785 A1 Mar. 16, 2023

Related U.S. Application Data

(60) Provisional application No. 63/240,852, filed on Sep. 3, 2021.

(51) Int. Cl.
*H04L 5/12* (2006.01)
*H04B 7/08* (2006.01)
*H04B 7/06* (2006.01)
*H04B 7/0426* (2017.01)

(52) U.S. Cl.
CPC ............ *H04B 7/086* (2013.01); *H04B 7/043* (2013.01); *H04B 7/0639* (2013.01); *H04B 7/0695* (2013.01)

(58) Field of Classification Search
CPC ...... H04B 7/086; H04B 7/043; H04B 7/0639; H04B 7/0695
USPC ............... 375/262, 260, 259, 219, 295, 316
See application file for complete search history.

(56) References Cited

U.S. PATENT DOCUMENTS

2019/0116605 A1\* 4/2019 Luo .................. H04W 72/0446
2022/0255611 A1\* 8/2022 Chavva ................ H04B 17/382

\* cited by examiner

*Primary Examiner* — Zewdu A Kassa
(74) *Attorney, Agent, or Firm* — Kilpatrick Townsend & Stockton LLP

(57) ABSTRACT

The present application relates to devices and components including apparatus, systems, and methods for determining a beam for communication between a user equipment and a base station. For example, angle of arrival estimates may be utilized for determining the beam for communication.

17 Claims, 16 Drawing Sheets

SENSOR ASSISTED BEAM TRACKING

CROSS-REFERENCE TO RELATED APPLICATION

This application claims priority to U.S. Provisional Patent Application No. 63/240,852, entitled "Sensor Assisted Beam Tracking", filed on Sep. 3, 2021, the disclosure of which is incorporated by reference herein in its entirety for all purposes.

BACKGROUND

Third Generation Partnership Project (3GPP) networks provide that base stations may utilize beam forming for transmitting signals on beams to user equipments (UEs). The UEs may determine a direction from which a beam is received from the base stations. In some embodiments, the UEs may utilize the determined direction to properly identify a received beam and/or may not monitor directions from which beams are not determined to be received.

DETAILED DESCRIPTION

Figure 1:
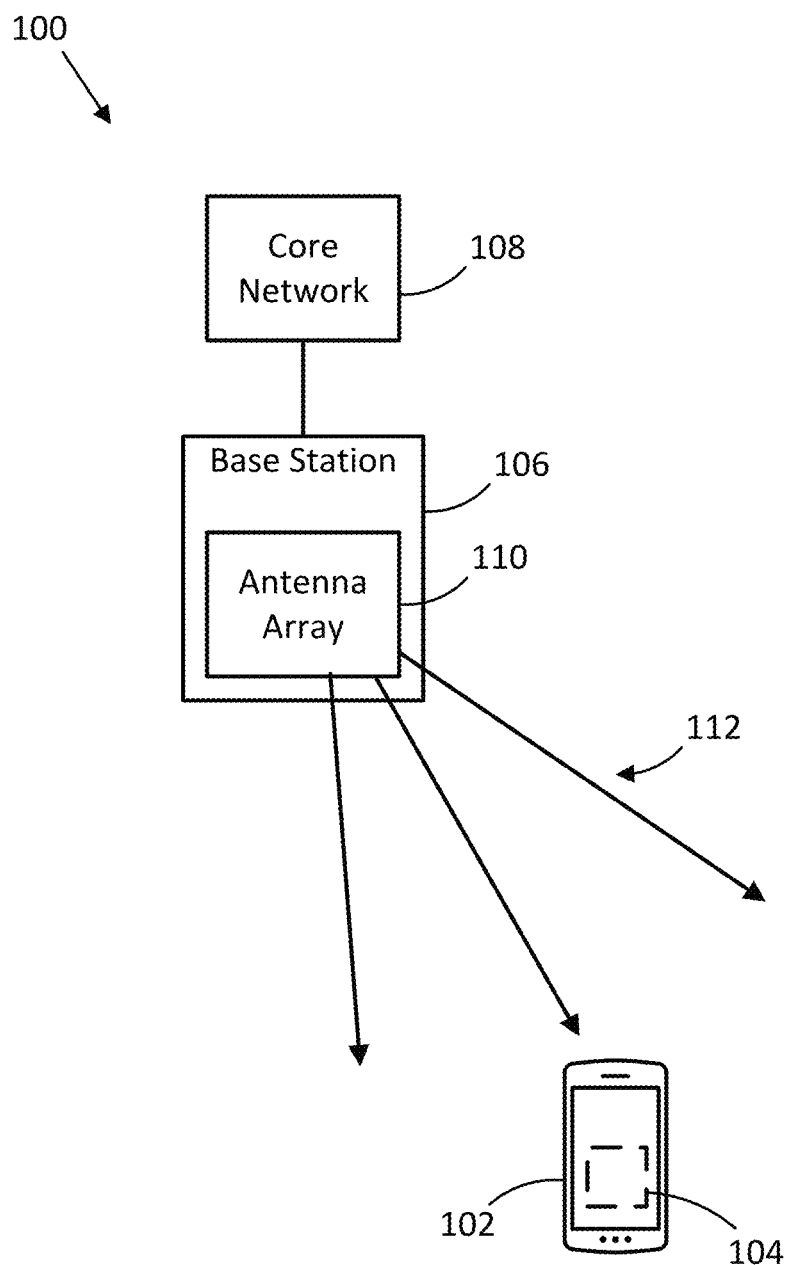
FIG. 1 illustrates an example system arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Centi/millimeter wave (mmWave) communication systems can provide a much larger data rate given the ultra-wide bandwidth as compared to wider bandwidth systems. There has been ever-growing interests and commercial deployments for mmWave networks including third generation partnership project (3GPP) fifth generation (5G) new radio (NR) (Frequency range 2, or FR2). Analog beamforming has been an essential technique to compensate the short range of coverage for mmWave system. Sensor information may be used to improve the beam determination for mmWave devices to reduce the latency and improve reliability. Approaches described herein may fuse the sensor information with radio beamforming.

The angle of arrival (AoA) for an incoming signal can be known to the receiver (such as a UE 1300 (FIG. 13)) by super resolution algorithms, which require exhaustive antenna pattern measurement and calibration. AoA may be ambiguous to receiver even when super resolution algorithm is applied. For example, with a linear array instead of two-dimensional (2D) array or other limitations on antenna placement the AoA may be ambiguous.

Motion sensor data can provide the rotation information for a device accurately, and hence may assist beam tracking. For example, an alternative beam may be selected once the device has rotated by a certain angle. However, device may lock orientation (AoA) to the initial beam (and maintain the lock through the beam tracking). An issue may be presented with sensor assisted beam tracking to resolve the AoA ambiguity or improve AoA resolution without resorting to AoA estimation algorithm.

FIG. 1 illustrates an example system arrangement 100 in accordance with some embodiments. In particular, the system arrangement 100 illustrates an example portion of a radio access network (RAN) that may implement beamforming. In some embodiments, the RAN may be a 5G network.

The system arrangement 100 may include a user equipment (UE) 102, such as the UE 1300 (FIG. 13)). A user may utilize the user equipment for accessing the RAN. For example, the UE 102 may communicate with components within the RAN to provide services to the user, such as voice call, text messaging, and/or other data-based service. The UE 102 may include one or more sensor devices 104. The sensor devices 104 may include motion sensor devices (such as accelerometers) that can determine motion of the UE 102. One or more processors of the UE 102 may receive data from the sensor devices 104 and determine an orientation of the UE 102 based on the date from the sensor devices 104.

The system arrangement 100 may further include a base station 106 (such as the gNB 1400 (FIG. 14)) and a core network (CN) 108 (such as the a 5th Generation Core network (5GC)). The base station 106 and the core network 108 may operate in combination to provide the services to the UE 102. The base station 106 may be coupled to the CN 108 through a backend that can provide for communication between the base station 106 and the CN 108.

The base station 106 may include an antenna array 110. The antenna array 110 may include one or more antennas that can allow the base station 106 to communicate wirelessly with UEs, such as the UE 102. The antennas of the antenna array 110, or some portion thereof, may emit beams 112 that can carry signals for communication with the UEs.

In some instances, the beams 112 may include training signals that can be utilized by the UEs to determine a beam that can provide service to the UE. The beams 112, or some portion thereof, may comprise pencil beams that have a narrow bandwidth.

The UE 102 may detect beams 112 from the antenna array 110 and utilize the beams 112 to communicate with the base station 106. When the beams 112 are narrow (such as in the case of pencil beams), if the detection by the UE 102 is not properly aligned with a beam providing service, the signal may be significantly degraded. As the UE 102 may not be static, having the UE 102 quickly adapt to the beam based on the motion of the UE 102 may reduce the chances of the signal being significantly degraded. As the UE 102 is moved, the UE 102 may determine different AoAs at which a beam is received and/or determine a different beam to be utilized based on the motion of the UE 102. The UE 102 may detect training signals received from the base station 106, and determine which beam to utilize for communication with the base station 106 and an AoA of the beam. For example, the UE 102 may produce an AoA estimate for the AoA o The UE 102 may utilize data from the sensor devices 104 to maintain the AoA in accordance with the approaches described throughout this disclosure. The use of the data from the sensor devices 104 may resolve AoA reliability issues and may improve AoA resolution as compared to non-sensor AoA determination approaches.

Figure 2:
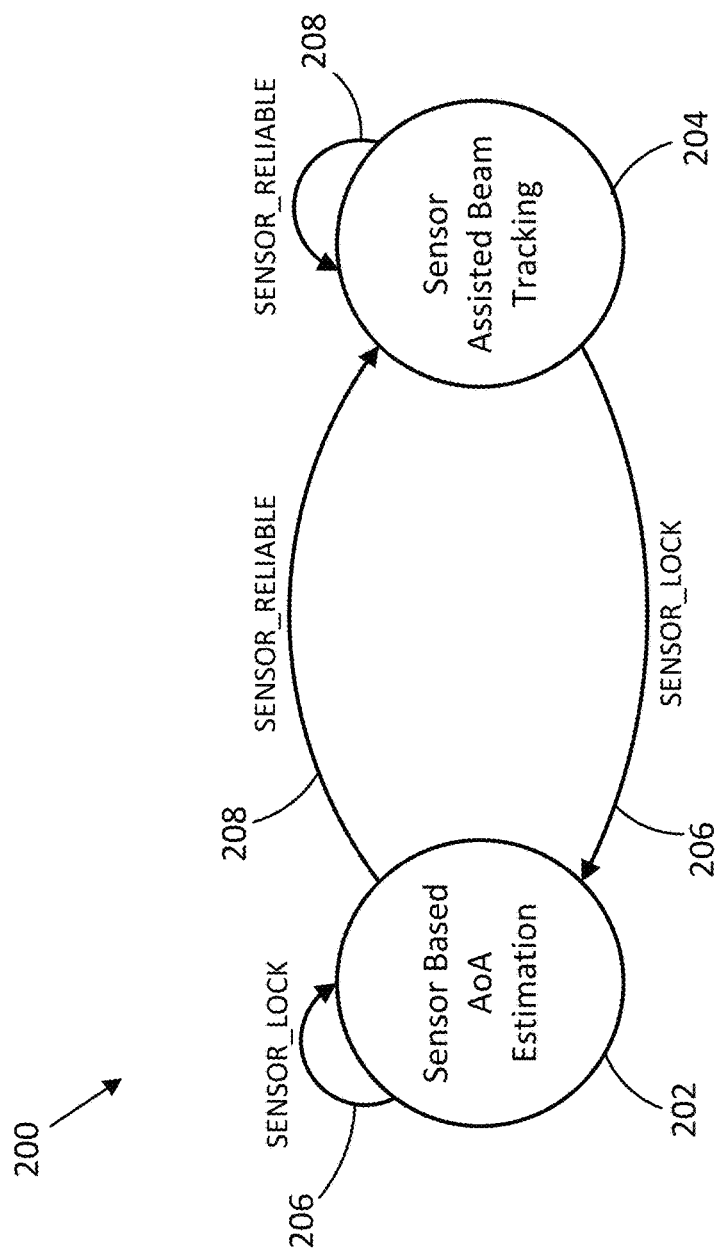
FIG. 2 illustrates an example state machine for sensor assisted beamforming framework in accordance with some embodiments.

FIG. 2 illustrates an example state machine 200 for sensor assisted beamforming framework in accordance with some embodiments. The sensor assisted beamforming framework may define operation of a UE (such as the UE 102 (FIG. 1) and/or the UE 1300 (FIG. 13)) for determining an AoA for a beam for utilization of the UE. For example, the state machine 200 illustrates states that may implemented by the UE that defines the operation of the UE with respect to determining an AoA for a beam. Sensor assisted beamforming framework may be a state machine with various operation stages and sensor states.

The state machine 200 may include two operation stages. For example, the state machine 200 may include a sensor based AoA estimation state 202. In some embodiments, the UE may initiate to the sensor based AoA estimation state 202. While in the sensor based AoA estimation state 202, the UE may monitor for training signals received from a base station (such as the base station 106 (FIG. 1) and/or the gNB 1400 (FIG. 14)). The UE may utilize the training signals to determine an AoA for a beam, such as via the approaches for determining AoAs based on training signals described further throughout this disclosure. The UE may produce an AoA estimate for the AoA based on the determination. The sensor based AoA estimation state 202 may include sensor assisted AoA acquisition to initialize the later beam tracking.

The state machine 200 may further include a sensor assisted beam tracking state 204. While in the sensor assisted beam tracking state 204, the UE may utilize data from sensor devices (such as the sensor devices 104 (FIG. 1)) to maintain an AoA for a beam. For example, the UE may have previously determined that an AoA estimate for the AoA of the beam has achieved a reliability. The UE may utilize the data from the sensor devices to maintain the AoA estimate as the UE is rotated. For example, the UE may produce a local anchor that can indicate a local AoA estimate (which may be an AoA estimate relative to the UE) when the reliability of the AoA estimate is determined. As the UE device is rotated, the UE may update the local AoA estimate based on the local anchor and a change in the orientation of the UE that may be determined based on the data from the sensor devices. Accordingly, the UE may maintain an AoA estimate relative to the UE based on the data from the sensor devices. The sensor assisted beam tracking state 204 may include sensor reading being used to assist beam determination.

The state machine 200 may include transitions among the sensor based AoA estimation state 202 and the sensor assisted beam tracking state 204 based on a determined reliability of an AoA estimate. In particular, the state machine 200 may include sensor lock transitions 206 and sensor reliable transitions 208. The UE may determine whether to implement a sensor lock transition 206 or a sensor reliable transition 208 based on a determined reliability of an AoA estimate of the UE at the time.

The UE may determine that a sensor lock transition 206 is to be implemented based on an AoA estimate not achieving a reliability. For example, the UE may determine that a reliability of the AoA estimate is less than a threshold and may determine that the sensor lock transition 206 is to be implemented. The UE may determine whether the AoA estimate achieves the reliability while the UE is in the sensor based AoA estimation state 202 and/or the sensor assisted beam tracking state 204. For example, the UE may determine whether the AoA estimate achieves the reliability when an AoA estimate is produced during the sensor based AoA estimation state 202 and/or when a maintained AoA estimate is validated in the sensor assisted beam tracking state 204 as described further throughout this disclosure. In some embodiments, the time between validations of the maintained AoA estimate in the sensor assisted beam tracking state 204 may be greater than a time between the AoA estimates are produced in the sensor based AoA estimation state 202.

The sensor lock transition 206 may be implemented by the UE when the AoA information is unknown (such as at initialization) or the AoA information is stalled (such as due to AoA change). The sensor lock transition 206 may indicate that the AoA needs to be relocked. Based on the sensor lock transition 206 being implemented, the UE may transition to the sensor based AoA estimation state 202, where the operations associated with the sensor based AoA estimation state 202 may be executed. For example, when the sensor lock transition 206 is implemented from the sensor based AoA estimation state 202, the UE may remain in the sensor based AoA estimation state 202. When the sensor lock transition 206 is implemented from the sensor assisted beam tracking state 204, the UE may transition to the sensor based AoA estimate state 202.

The UE may determine that a sensor reliable transition 208 is to be implemented based on an AoA estimate achieving reliability. For example, the UE may determine that a reliability of the AoA estimate is greater than or equal to the threshold and may determine that the sensor reliable transition 208 is to be implemented. The UE may determine whether the AoA estimate achieves the reliability while the UE is in the sensor based AoA estimation state 202 and/or the sensor assisted beam tracking state 204. For example, the UE may determine whether the AoA estimate achieves the reliability when an AoA estimate is produced during the sensor based AoA estimation state 202 and/or when a maintained AoA estimate is validated in the sensor assisted beam tracking state 204. In some embodiments, the time between validations of the maintained AoA estimate in the sensor assisted beam tracking state 204 may be greater than a time between the AoA estimates are produced in the sensor based AoA estimation state 202.

The sensor reliable transition 208 may be implemented by the UE when the AoA information is reliable, such that the sensor data can be applied to update the beam. Once the sensor reliable transition 208 is achieved (such as during AoA estimation) or maintained (such as during beam tracking), the sensor assisted beam tracking state 204 may be executed. Based on the sensor reliable transition 208 being implemented, the UE may transition to the sensor assisted beam tracking state 204, where the operations associated with the sensor assisted beam tracking state 204 may be executed. For example, when the sensor reliable transition 208 is implemented from the sensor based AoA estimation state 202, the UE may transition to the sensor assisted beam tracking state 204. When the sensor reliable transition 208 is implemented from the sensor assisted beam tracking state 204, the UE may remain in the sensor assisted beam tracking state 204.

Figure 3:
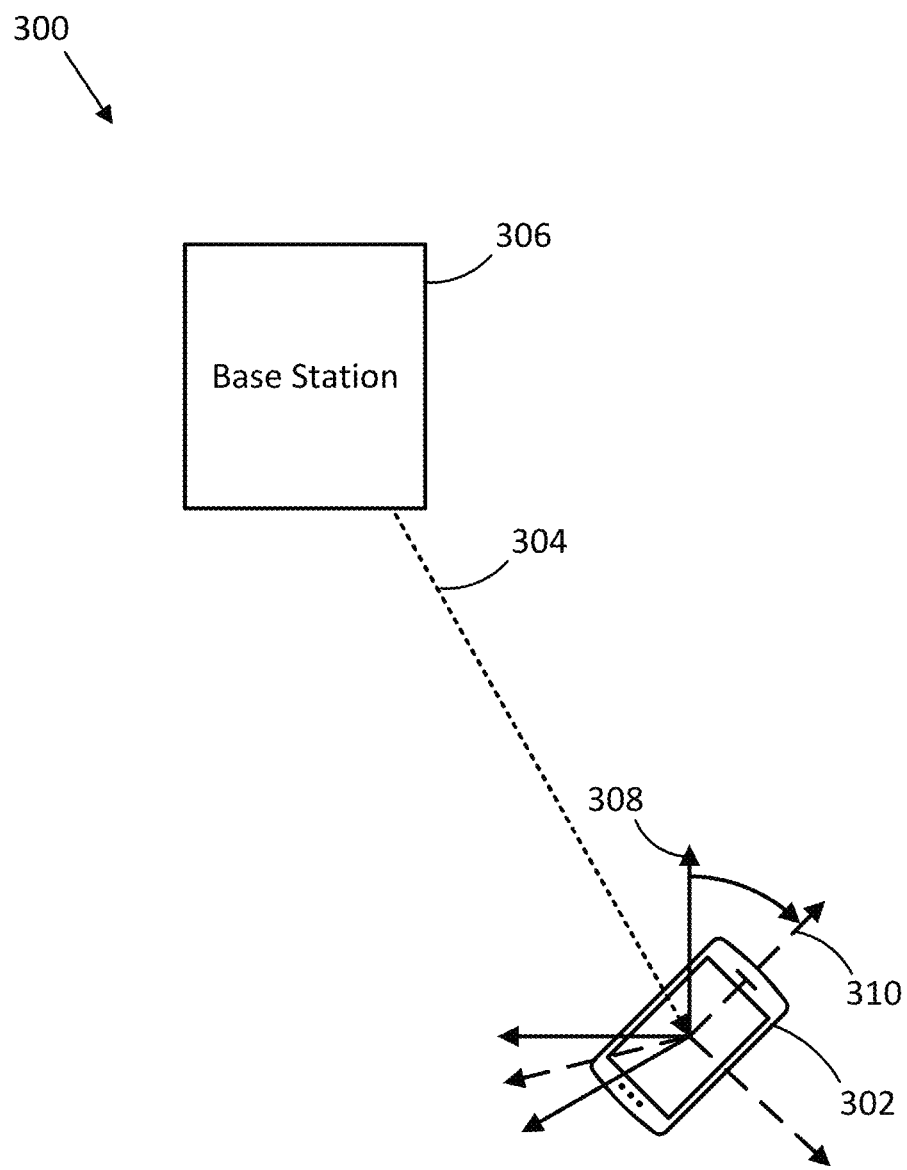
FIG. 3 illustrates an example system arrangement in accordance with some embodiments.

FIG. 3 illustrates an example system arrangement 300 in accordance with some embodiments. The system arrangement 300 illustrates example coordinate system operation for AoA determination. For example, the system arrangement 300 illustrates coordinate systems that may be implemented by a UE 302 for determining an AoA of a beam 304 received from a base station 306. The UE 302 may include one or more of the features of the UE 102 (FIG. 1). Further, the base station 306 may include one or more of the features of the base station 106 (FIG. 1).

The system arrangement 300 may include a global coordinate system (GCS) 308 (which may be referred to as a reference system), as illustrated by the axes. The GCS 308 may have an orientation in reference to the physical world. For example, the GCS 308 may have an orientation with the z-axis of the GCS 308 extending substantially (within 10 degrees) away from the earth at a radii from the center of the earth, and the x-axis and y-axis extending at perpendicular directions from each other and to the z-axis in some embodiments. An AoA is typically constant over a large time scale in the GCS 308, such as when the AoA is for a user device being used by a pedestrian. This may be true for mmWave communication systems for which the typical use case of the UE 302 is by a pedestrian. The AoA in the GCS 308 may be typically unchanged for a good amount of time for a pedestrian user, even with rotation of the UE 302.

The system arrangement 300 may further include a local coordinate system (LCS) 310 (which may be referred to as a device system), as illustrated by the axes. The LCS 310 may have an orientation that is fixed related to the body of the UE 302. For example, the LCS 310 may have an orientation with the z-axis of the LCS 310 extending perpendicular to a top of the UE 302, the x-axis extending perpendicular to a side of the UE 302, and the y-axis extending perpendicular to both the z-axis and the x-axis (such as extending perpendicular to a screen of the UE 302) in some embodiments. An AoA may be more volatile in the LCS 310 than in the GCS 308 due to user behavior (such as rotation of the UE 302, flipping of the UE 302, and/or other motion of the UE 302 that may be applied by the user. In particular, AoA in LCS may change due to device rotation. The volatile nature of the LCS 310 may be helpful and may be leveraged to improve global AoA estimation.

Radio based beam measurement may provide the beam qualities for a set of pre-determined beams (such as the AoAs), including the beam 304. When AoA is based on a single observation, the AoA may be either ambiguous (such as for a linear array) or low resolution (such as for a small codebook or other practical limitations). Once the UE 302 is in motion (for example, rotation of the UE 302), multiple (independent) beam measurements may be leveraged together with the sensor data during an observation period to improve AoA estimates, such as AoA estimates made by the UE 302.

The AoAs in different coordinate systems can be converted using the orientation rotations. For example, a global AoA in the GCS 308 may be converted to a local AoA in the LCS 310 using the orientation rotations of the UE 302, and a local AoA in the LCS 310 may be converted to a global AoA in the GCS 308 using the orientation rotations of the UE. The AoAs may be converted between the GCS 308 and the LCS 310 via quaternion, rotation matrix, Euler angles, and/or other approaches for converting points between different coordinate systems. For example, a global AoA having coordinates $(\phi \theta)_{GCS}$ in the GCS 308 (where $\phi$ is an azimuth angle and $\theta$ is an elevation angle in the GCS 308) may be converted to a local AoA having coordinates $(\hat{\phi}, \hat{\theta}, t)_{LCS}$ in the LCS 310 (where $\hat{\phi}$ is an azimuth angle and $\hat{\theta}$ is an elevation angle in the LCS 310, and t is a time), and vice versa.

One or more sensor devices (such as motion sensors) can provide LCS-GCS orientation rotation information at each time. For example, the sensor input may be utilized to determine coordinate system orientation rotation, such as quaternion q(t). One or more sensor devices (such as the sensor devices 104 (FIG. 1)) may provide information related to an orientation of the UE 102. Based on the information from the sensor devices, the UE 102 may determine an orientation of the LCS 310. The UE 302 may further determine a rotation difference between the GCS 308 and the LCS 310 based on the orientation of the LCS 310. Due to possible limitations, the orientation of the LCS 310 determined and the rotation difference determined may be estimates based on the information from the sensor device.

An AoA (and then the beam) of the LCS 310 may be tracked across time, anchored at GCS AoA $(\phi, \theta)$, $\stackrel{q(t)}{\longleftrightarrow}$ $(\hat{\phi}, \hat{\theta}; t)$. For example, the UE 302 may determine a global AoA in the GCS 308 for a beam and set the global AoA as an anchor. Based on the rotation difference between the GCS 308 and the LCS 310, the UE 302 may apply the rotation difference to the anchor to determine a local AoA in the LCS 310. As the UE 102 rotates over time, the UE 102 may continue to determine the rotation difference at a current time, and apply the rotation different to the anchor to update the local AoA in the LCS 310.

Figure 4:
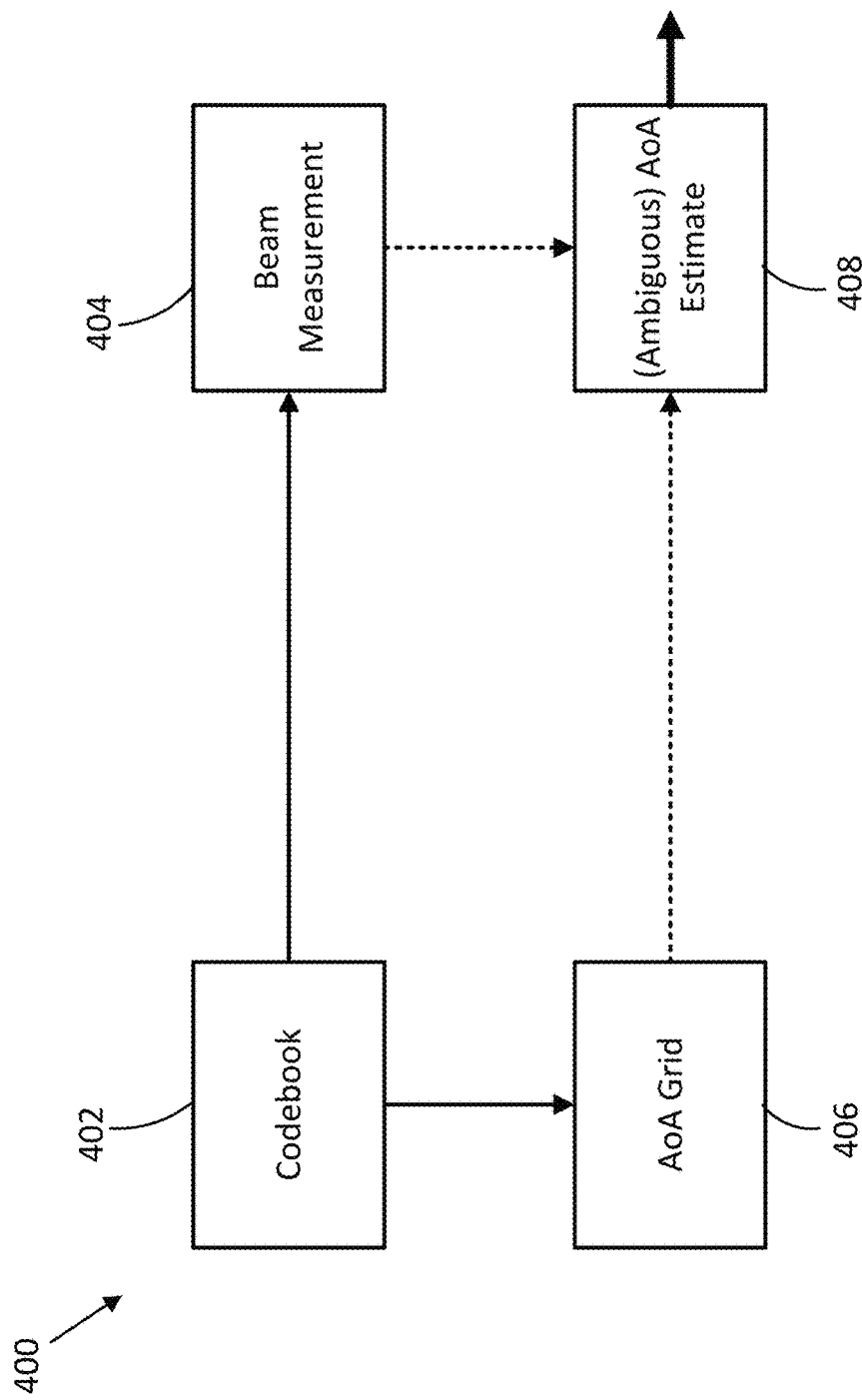
FIG. 4 illustrates a block diagram of a beam quality based angle of arrival (AoA) estimate approach in accordance with some embodiments.

FIG. 4 illustrates a block diagram of a beam quality based AoA estimate approach 400 in accordance with some embodiments. For example, the beam quality based AoA estimate approach 400 may be a beam quality based AoA estimate approach for one measurement.

The beam quality based AoA estimate approach 400 may include a codebook 402. For example, a set of directions and/or a codebook 402 may be defined for beams. A set of beams may be defined and/or calibrated with different steering directions for a phase array. The set of beams for which the set of directions and/or codebook 402 is defined may be defined as $\mathcal{W} = \{w_1, w_2, \ldots, w_K\}$.

A beam measurement 404 may be performed for the beams provided via the codebook 402. For example, a UE (such as the UE 102 (FIG. 1)) may perform a beam measurement of the beams to produce reference signal received power (RSRP) and/or signal to interference and noise ratio (SINR) for each of the beams. The UE may be able to determine the strength of each of the beams based on the RSRP and/or the SINR for each of the beams. A response to the quality of each beam may be defined as $\gamma(w_1; t), \ldots, \gamma(w_K; t)$, where $w_*$ is a beam at reference * and t is a time reference.

The beams/steering direction may be mapped to one or more AoAs, such as via an AoA grid 406. For example, the UE may map each of the beams/steering directions to one or more AoAs within the AoA grid 406. A beam may be mapped to the same azimuth angle but different elevation angles for a linear array. For example, the mapping may be represented as $w_k \mapsto \hat{S} = \{(\hat{\phi}_{k_1}, \hat{\theta}_{k_1}), \ldots, (\hat{\phi}_{k_n}, \hat{\theta}_{k_n})\}$, $w_k$ represents the set of beams, $\hat{S}_k$ represents the set of mappings for a beam at reference k, $\hat{\phi}_k$ is the azimuth angle in the AoA grid 406 for a component * of a beam at reference k, and $\hat{\theta}_k$ is an elevation an angle in the AoA grid 406 for a component * of the beam at reference k. Further, the mapped values may be represented as $\hat{S}_1 \cup \ldots \cup \hat{S}_K = \hat{S}$, where $\hat{S}$ is the full grid set. The UE may quantize the field of view of this phase array into a two-dimensional (2D) LCS AoA. For example, $\hat{S} = \{(\hat{\phi}_1, \hat{\theta}_1), \ldots (\hat{\phi}_N, \hat{\theta}_N)\} \subset \text{FOV}$, where $\hat{\phi}_*$ is a mapped azimuth angle of beam at reference * in the LCS, $\hat{\theta}_*$ is a mapped elevation angle of beam at reference * in the LCS, and FOV is a field of view.

The AoA grid 406 may be defined to represent a whole sphere in the LCS. The sphere may be partitioned into subparts over the sphere. Each beam may cover a range of LCS AoA within the AoA grid. For example, subsets of the sphere may be covered by $w_k$.

The UE may produce an AoA estimate 408 based on the beam measurements 404 and/or the AoA grid 406, where the AoA estimate 408 may be ambiguous. In some embodiments, the AoA estimate 408 may be a local AoA estimate. Once the beam measurement 404 of the beam has been performed, the UE may determine the how reliable and/or likely the AoA estimate 408 produced based on the AoA grid 406 is.

In some embodiments, the UE may determine whether the AoA estimate 408 has achieved a reliability based on a hard decision. For example, the UE may determine which of the beams has the strongest beam measurement and then determine whether the AoA estimate 408 is within the subset of the AoA grid 406 cover by the beam that has the strongest beam measurement. For example, the hard decision may be represented by $$w_k = \arg\max_{1 \leq i \leq K} \gamma(w_i; t) \rightarrow (\hat{\phi}, \hat{\theta}; t) \in \hat{S}_K.$$

In some embodiments, the UE may determine whether the AoA estimate 408 has achieved a reliability based on a soft decision. For example, the UE may determine a probability of each AoA in the AoA grid 406. In particular, the UE may determine for each of the subsets within the AoA grid 406 a likelihood that the AoA is within the subset. The UE may then determine whether a subset corresponding to the AoA estimate 408 has a probability of the AoA being located within the subset greater than a threshold value. For example, the soft decision may be represented by $P((\hat{\phi}, \hat{\theta}, t) \in \hat{S}_K) \propto \gamma(w_k)$.

The UE may further convert a probability of the AoA grid 406, which may be in the LCS, into a probability in the GCS. In some embodiments, the UE may perform a quaternion with a local probability in the LCS corresponding the AoA grid 406 to produce a global probability in the GCS. The conversion may be represented by $P(\hat{\phi}, \hat{\theta}, t) \xrightarrow{q(t_0)} P(\phi, \theta)$, where $P(\hat{\phi}, \hat{\theta}; t)$ is a probability that the AoA is in a subset in the LCS and $P(\phi, \theta)$ is a probability that the AoA is in a subset in the GCS. The beam quality based AoA estimate approach 400 may produce a coarse or ambiguous estimate of AoA.

Figure 5:
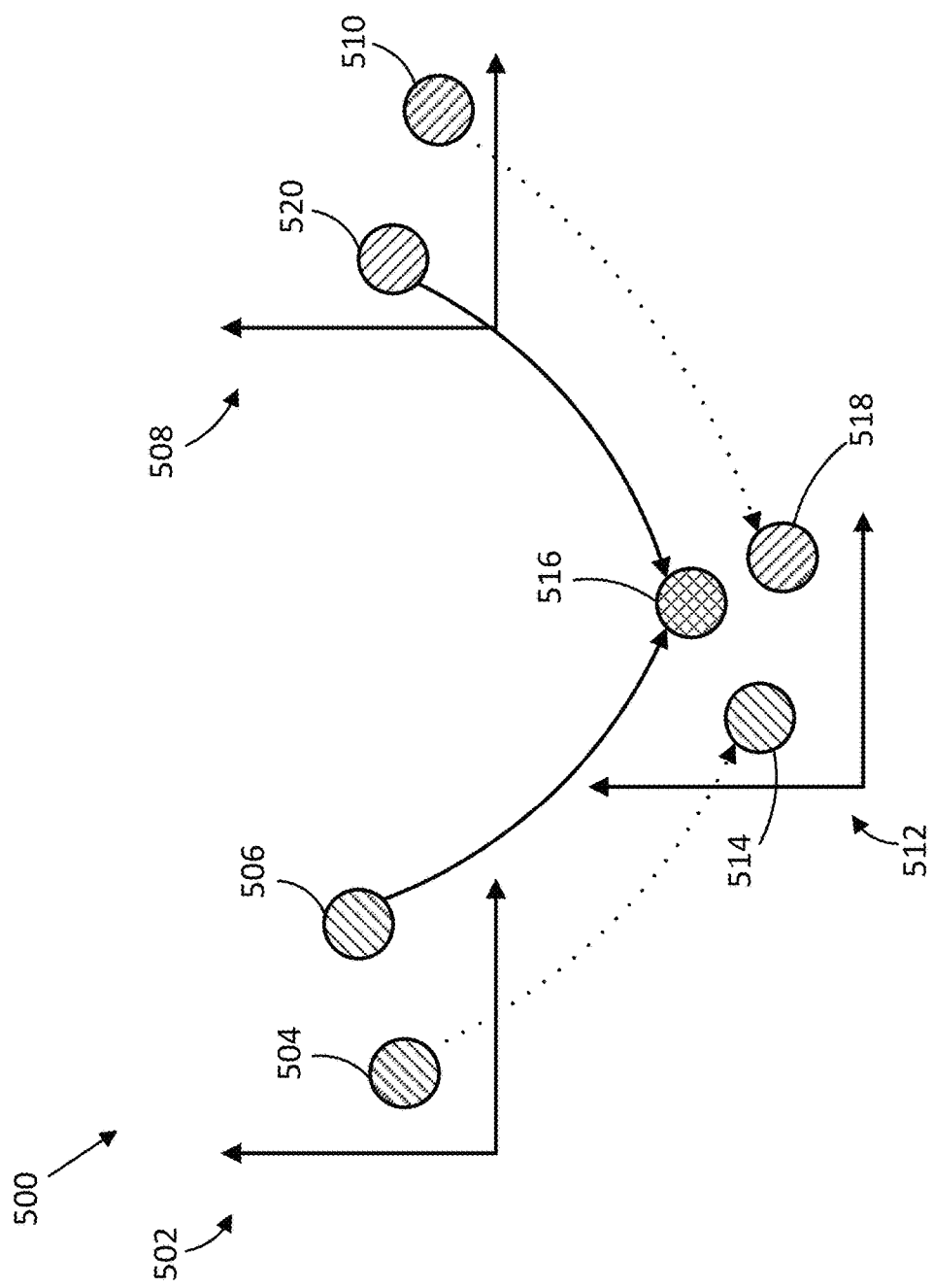
FIG. 5 illustrates a block diagram of another beam quality based AoA estimate approach in accordance with some embodiments.

FIG. 5 illustrates a block diagram of another beam quality based AoA estimate approach 500 in accordance with some embodiments. The beam quality based AoA estimate approach 500 may be a beam quality based AoA estimate approach for multiple measurements. In the illustrated embodiment, the beam quality based AoA estimate approach 500 is performed for two measurements.

The beam quality based AoA estimate approach 500 may include performing beam measurements of beams at multiple different times, such as two different times in the illustrated embodiment. For example, a UE may perform beam measurements of beams at multiple different times. The UE may produce one or more local AoA estimates at each time based on the beam measurements for the time the local AoA estimates may be produced in accordance with the approach for producing local AoA estimates described in relation to the beam quality based AoA estimate approach 400 (FIG. 4). The UE may produce the local AoA estimates based on the positions corresponding to the local AoA estimates achieving a certain reliability (such as a corresponding reliability exceeding a threshold).

In the illustrated embodiment, the beam quality based AoA estimate approach 500 includes a first LCS graph 502. The first LCS graph 502 may show local AoA estimates produced by the UE based on beam measurements performed by the UE at a first time. In the illustrated embodiment, the first LCS graph 502 includes a first local AoA estimate 504 at a first position and a second local AoA estimate 506 at a second position. The first position may correspond to a first subset of a grid arrangement in the LCS and the second position may correspond to a second subset of a grid arrangement in the LCS.

Further, the beam quality based AoA estimate approach 500 includes a second LCS graph 508 in the illustrated embodiment. The second LCS graph 508 may show local AoA estimates produced by the UE based on beam measurements performed by the UE at a second time. The second time may be subsequent to the first time in some instances. In the illustrated embodiment, the second LCS graph 508 includes a third local AoA estimate 520 at a first position and a fourth local AoA estimate 510 at a second position. The first position may correspond to a third subset of a grid arrangement in the LCS and the second position may correspond to a fourth subset of a grid arrangement in the LCS. In some instances, the third subset and the fourth subset may be the same subsets as first subset and the second subset, or portion of each may be the same subsets.

The beam quality based AoA estimate approach 500 includes a GCS graph 512 in the illustrated embodiment. The GCS graph 512 may show global AoA estimates produced based on the local AoA estimates from the first LCS graph 502 and the second LCS. For example, the UE may convert the local AoA estimates in the LCS into global AoA estimates. The UE rotation from LCS at each opportunity may be provided by sensor devices (for example, q(t)). In particular, sensor devices (such as the sensor devices 104 (FIG. 1) may provide information to the UE and the UE may determine rotation between the LCS and the GCS at each of times when the measurements were made. The UE may use the rotation between the LCS and the GCS at each of the times to convert the local AoA estimates within the first LCS graph 502 and the local AoA estimate within the second LCS graph 508 to global AoA estimates in the GCS. Accordingly, the GCS AoA (which may be referred to as global AoA) may be estimated ambiguously at each time.

The GCS graph 512 may include a first global AoA estimate 514, a second global AoA estimate 516, and a third global AoA estimate 518 in the illustrated embodiments. The UE may have produced the first global AoA estimate 514 by converting the first local AoA estimate 504 to the GCS. Further, the UE may have produced the third global AoA estimate 518 by converting the fourth local AoA estimate 510 to the GCS. In the illustrated embodiment, the conversion of the second local AoA estimate 506 and the conversion of the third local AoA estimate 520 may result in global AoA estimates in a same subset. Accordingly, the GCS conversion of the second local AoA estimate 506 and the third local AoA estimate 520 may overlap and produce the second global AoA estimate 516. For example, the UE may have converted the second local AoA estimate 506 and the third local AoA estimate 520 to the GCS to produce the second global AoA estimate 516.

The UE may attempt to determine the best beam for operation based on the global AoA estimates presented in the GCS graph 512. The UE may assume that the true GCS AoA has not changed. Therefore, the ambiguity of the GCS estimates can be resolved by selecting the most overlapped GCS across estimates. For example, the UE may determine that the second global AoA estimate 516 is the most overlapped in the illustrated embodiment based on the conversion of both the second local AoA estimate 506 and the third local AoA estimate 520 resulting in the second global AoA estimate 516. Accordingly, the UE may determine that the second global AoA estimate 516 corresponds to the best beam and the second global AoA estimate 516 is to be utilized as the global AoA estimate based on the overlapping conversions.

Once the global AoA estimate has been determined, the UE may determine whether a sensor reliable transition (such as the sensor reliable transition 208 (FIG. 2)) or a sensor lock transition (such as the sensor lock transition 206 (FIG. 2)) is to be implemented based on the global AoA estimate. In instances where the UE is operating in a sensor based AoA estimate state (such as the sensor based AoA estimate state 202 (FIG. 2)) when the global AoA estimate is produced, the UE may determine whether the global AoA estimate has achieved a reliability. For example, a probability that an AoA may be located at the second global AoA estimate 516 may be determined based on probabilities that the AoA is at the second local AoA estimate 506 and that the AoA is at the third local AoA estimate 520. If the probability corresponding to the second global AoA estimate 516 is determined to be greater than or equal to a threshold, the UE may determine that a sensor reliable transition is to be implemented based on the global AoA estimate. If the probability corresponding to the second global AoA estimate 516 is determined to be less than the threshold, the UE may determine that a sensor lock transition is to be implemented.

In instances where the UE is operating in a sensor assisted beam tracking state (such as the sensor assisted beam tracking state 204 (FIG. 2)) when the global AoA estimate is produced, the UE may determine whether the global AoA estimate matches an AoA estimate being maintained during the sensor assisted beam tracking state. For example, the UE may compare the AoA of the second global AoA estimate 516 with an AoA of an AoA estimate being maintained during the sensor assisted beam tracking state. If the AoA of the second global AoA estimate 516 matches the AoA of the AoA estimate being maintained, the UE may determine that the sensor reliable transition is to be implemented. If the AoA of the second global AoA estimate 516 does not match the AoA estimate being maintained, the UE may determine that the sensor lock transition is to be implemented. In some embodiments where a probability of the second global AoA estimate 516 is below a threshold, the UE may remain in the sensor assisted beam tracking state without performing the comparison.

Figure 6:
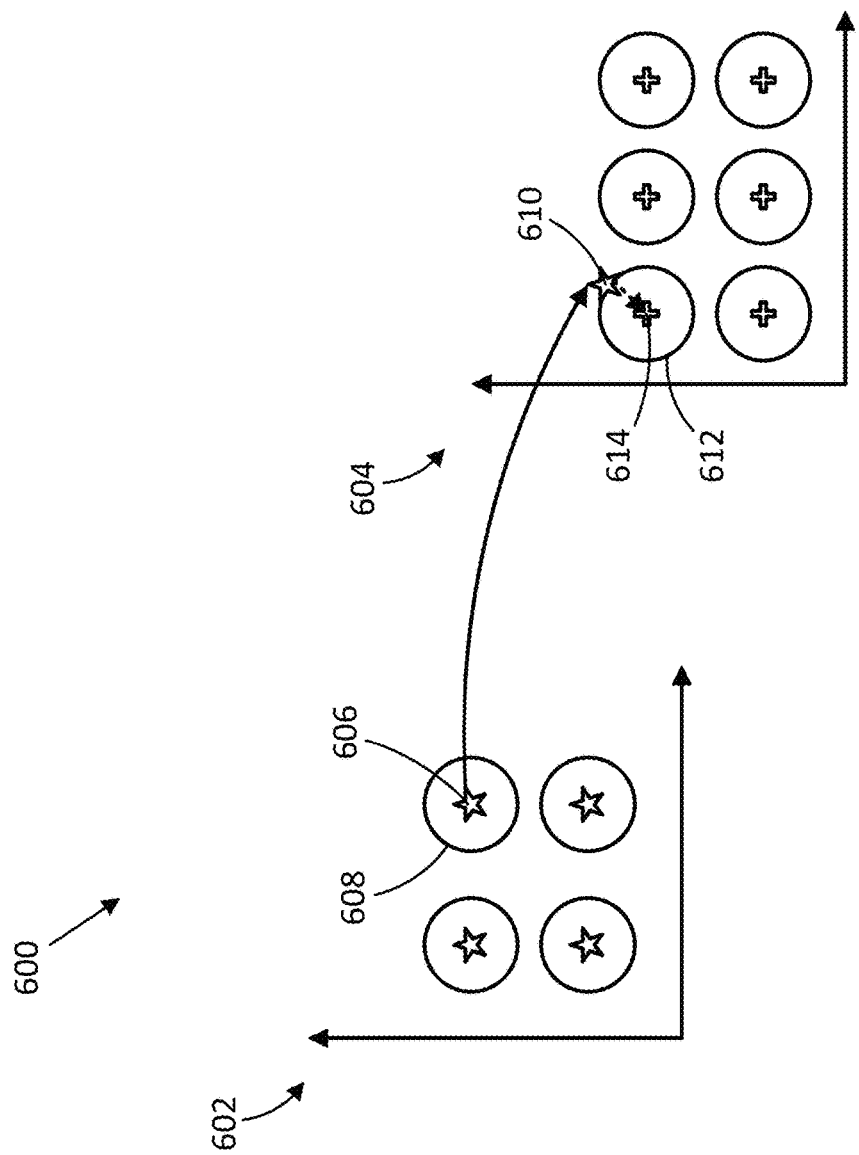
FIG. 6 illustrates an example of a local AoA estimate conversion to a global AoA estimate approach in accordance with some embodiments.

FIG. 6 illustrates an example of a local AoA estimate conversion to a global AoA estimate approach 600 in accordance with some embodiments. For example, the approach 600 may illustrate a conversion from the local AoA estimate from a first grid arrangement for an LCS to a global AoA estimate within a second grid arrangement for an GCS.

A LCS AoA grid may be defined, such that a beam can be mapped to one or more AoA grid points. Computation/calibration complexity reduction, robustness improvement may result from the implementation of the LCS AoA grid. LCS to GCS AoA conversion can be arbitrary with any sensor reading. There may not be common GCS AoA across measurement opportunities (since LCS AoA is quantized). Therefore, a GCS AoA grid is also defined such that a LCS AoA is converted and quantized to a GCS AoA grid point given the sensor reading.

For example, the UE may generate a grid arrangement in the LCS, where the grid arrangement may form a sphere in the LCS with multiple subgroups. Further, a grid arrangement may be generated (either by the UE or the base station) in the GCS, where the grid arrangement may form a sphere in the LCS with multiple subgroups. The grid arrangement in the LCS may differ from the grid arrangement in the GCS such that positions of the subgroups in the grid arrangements do not align perfectly. In these embodiments, the conversion of local AoA estimate from a grid arrangement in the LCS to a global AoA estimate in a grid arrangement in the GCS may result in the converted local AoA estimate being quantized to a defined closest subgroup in the grid arrangement of the GCS.

In the illustrated embodiment, the approach 600 may include a LCS graph 602 and a GCS graph 604. The LCS graph 602 may illustrate one or more local AoA estimates. In the illustrated embodiment, a local AoA estimate 606 is referred to for illustration of conversion from a grid arrangement for the LCS to a grid arrangement for the GCS. The local AoA estimate 606 may be located within a center of a first subgroup 608 of a grid arrangement of the LCS. The position of the local AoA estimate 606 may be defined as $(\hat{\phi}_n, \hat{\theta}_n)$, where $\hat{\phi}_n$ is the azimuth angle of the local AoA estimate 606 and $\hat{\theta}_n$ is the elevation angle of the local AoA estimate 606.

The UE may then convert the local AoA estimate 606 to the GCS in accordance with approaches described throughout this disclosure. The conversion of the local AoA estimate 606 may result in a position 610 in the GCS, which may be defined as $(\phi', \theta')$, where $\phi'$ is the azimuth angle of the position 610 and $\theta'$ is the elevation angle of the position 610. As can be seen from the GCS graph 604, the position 610 does not correspond to any of the global AoA estimates (as illustrated by the +symbols). However, the position 610 may be located within a second subgroup 612 of a grid arrangement of the LCS. The UE may determine that the position 610 is to be represented by a closest global AoA estimate, which is global AoA estimate 614 represented by $(\phi_m, \theta_m)$ in the illustrated embodiment, where $\phi_m$ is the azimuth angle of the global AoA estimate 614 and $\theta_m$ is the elevation angle of the global AoA estimate 614. For example, the UE may determine a global AoA estimate within a grid arrangement of a GCS from a local AoA estimate within a grid arrangement of a LCS based on $$(\phi_m, \theta_m) = \min_{1 \le i \le M} dist((\phi_i, \theta_i), (\phi', \theta')).$$

Figure 7:
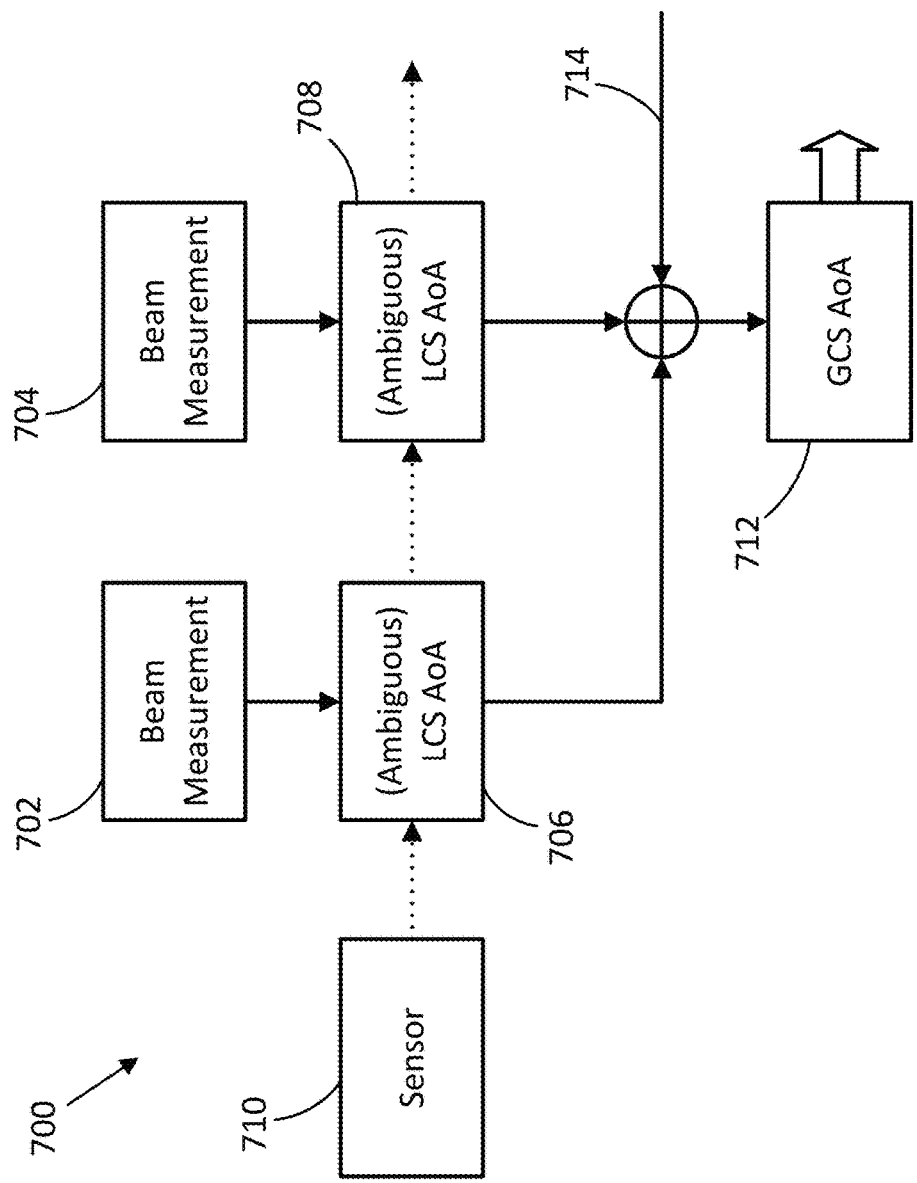
FIG. 7 illustrates an example beam quality based AoA estimate approach in accordance with some embodiments.

FIG. 7 illustrates an example beam quality based AoA estimate approach 700 in accordance with some embodiments. In particular, the beam quality based AoA estimate approach 700 may be implemented in embodiments where two or more measurements have been performed.

The beam quality based AoA estimate approach 700 may include performing a beam measurement 702 at a first time and a beam measurement 704 at a second time. For example, a UE (such as the UE 102 (FIG. 1)) may perform the beam measurement 702 of a beam received from a base station (such as the base station 106 (FIG. 1)) at a first time and may perform the beam measurement 704 of the beam at a second time. The UE may determine one or more responses from the beam measurement 702, where the responses may be represented by $\gamma(w_1; t_1), \ldots, \gamma(w_K; t_1)$, where $w_*$ is a beam at reference $*$ and $t_1$ is the first time. Further, the UE may determine one or more responses from the beam measurement 704, where the responses may be represented by $\gamma(w_1; t_2), \ldots, \gamma(w_K; t_2)$, where $w_*$ is a beam at reference $*$ and $t_2$ is the second time.

The beam quality based AoA estimate approach 700 may further include determining probabilities for a first LCS AoA 706 from the results of the beam measurement 702 at the first time and determining probabilities for a second LCS AoA 708 at the second time. For example, beam quality to LCS AoA estimate may be performed. In particular, the UE may utilize the results of the beam measurement 702 to determine probabilities of a true AoA corresponding to each local AoA estimate within an LCS at the first time, which may be represented by $P(\hat{\phi}_n, \hat{\theta}_n; t_1); n=1, \ldots, N$, where n is a reference of a local AoA estimate, $\hat{\phi}_n$ is an azimuth angle for the local AoA estimate, and $\hat{\theta}_n$ is an elevation angle for the local AoA estimate. The UE may utilize the results of the beam measurement 704 to determine probabilities of a true AoA corresponding to each local AoA estimate within the LCS at the second time, which may be represented by $P(\hat{\phi}_n; \hat{\theta}_n; t_2)$.

The beam quality based AoA estimate approach 700 may further include converting the probabilities of the LCS to GCS and combining the probabilities in GCS AoA 712. For example LCS to GCS AoA mapping may be performed. In particular, the UE may receive information from one or more sensor devices 710 (such as the sensor devices 104 (FIG. 1)) regarding an orientation of the UE, and may determine a difference between the LCS and the GCS at the first time and a difference between the LCS and the GCS at the second time. The UE may utilize the difference between the LCS and the GCS at the first time to convert the probabilities from the first LCS AoA 706 to GCS, which may be represented by $\hat{S} \rightarrow S : P(\phi_m, \theta_m; t_1); m=1, \ldots, M$, where $\phi_m$ is the azimuth angle converted to the GCS and $\theta_m$ is the elevation angle converted to the GCS. The UE may utilize the difference between the LCS and the GCS at the second time to convert the probabilities from the second LCS AoA 708 to GCS, which may be represented by $P(\phi_m, \theta_m; t_2)$.

The UE may then combine the probabilities for the global AoA estimates from the first LCS AoA 706 with the probabilities for the global AoA estimates from the second LCS AoA 708. In some embodiments, the probabilities may be combined with additional probabilities for AoA estimates from beam measurements performed at other times, as indicated by input 714. The additional probabilities may be represented by $P(\phi_m, \theta_m; t_i)$, where $t_i$ is time at i. The combined probabilities may provide a long term probability (for example, a joint probability) for GCS AoA (such as global AoA estimates), which may be represented by $P(\phi_m, \theta_m; t_1, t_2, \ldots) = C_{norm} \cdot \Pi_t P(\phi_m, \theta_m; t)$, where $P(\phi_m, \theta_m; t)$ is an instantaneous probability for GCS of $\phi_m, \theta_m$ at time t and $P(\phi_m, \theta_m; t_1, t_2, \ldots)$ is the long term probability over multiple measurements for this GCS grid point. The UE may then determine the global AoA estimate to be utilized is to be the global AoA estimate with the largest probability, which may be represented by $\phi^*$, $$\theta^* = \arg\max_m P(\phi_m, \theta_m; t_1, t_2, \ldots),$$

where $\phi^*$ is the azimuth angle of the global AoA estimate to be utilized, and $\theta^*$ is the elevation angle of the global AoA estimate to be utilized.

Once the global AoA estimate has been determined, the UE may determine whether a sensor reliable transition (such as the sensor reliable transition 208 (FIG. 2)) or a sensor lock transition (such as the sensor lock transition 206 (FIG. 2)) is to be implemented based on the global AoA estimate. In instances where the UE is operating in a sensor based AoA estimate state (such as the sensor based AoA estimate state 202 (FIG. 2)) when the global AoA estimate is produced, the UE may determine whether the global AoA estimate has achieved a reliability. If the probability corresponding to the global AoA estimate is determined to be greater than or equal to a threshold, the UE may determine that a sensor reliable transition is to be implemented based on the global AoA estimate. If the probability corresponding to the global AoA estimate is determined to be less than the threshold, the UE may determine that a sensor lock transition is to be implemented.

In instances where the UE is operating in a sensor assisted beam tracking state (such as the sensor assisted beam tracking state 204 (FIG. 2)) when the global AoA estimate is produced, the UE may determine whether the global AoA estimate matches an AoA estimate being maintained during the sensor assisted beam tracking state. For example, the UE may compare the AoA of the global AoA estimate with an AoA of an AoA estimate being maintained during the sensor assisted beam tracking state. If the AoA of the global AoA estimate matches the AoA of the AoA estimate being maintained, the UE may determine that the sensor reliable transition is to be implemented. If the AoA of the global AoA estimate does not match the AoA estimate being maintained, the UE may determine that the sensor lock transition is to be implemented. In some embodiments where a probability of the global AoA estimate is below a threshold, the UE may remain in the sensor assisted beam tracking state without performing the comparison.

Figure 8:
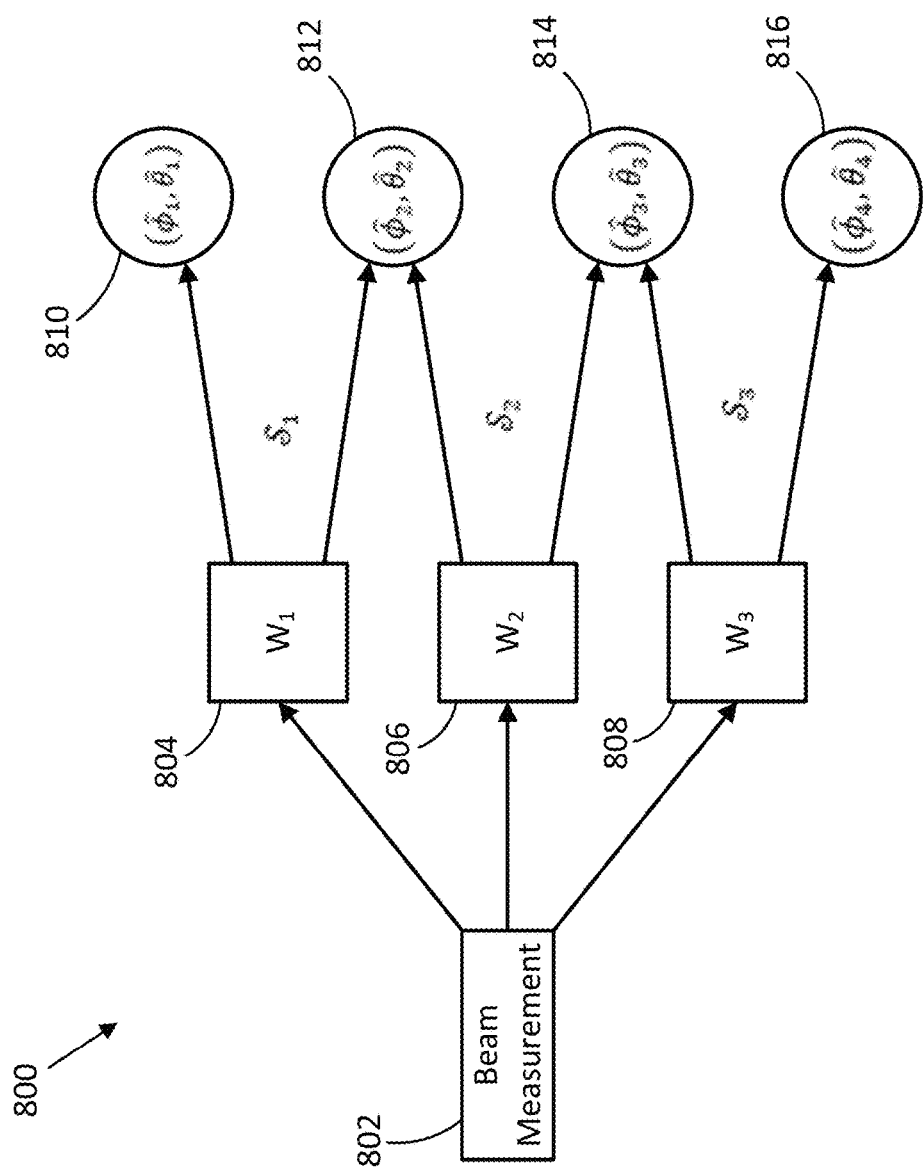
FIG. 8 illustrates an AoA probability based on beam measurement approach in accordance with some embodiments.

FIG. 8 illustrates an AoA probability based on beam measurement approach 800 in accordance with some embodiments. In particular, the approach 800 illustrates how probabilities may be determined for steering directions (such as AoA estimates). The approach 800 may be implemented by a UE (such as the UE 102 (FIG. 1)) to determine the probabilities for steering directions.

The approach 800 may include performing beam measurements 802 for one or more beams. In particular, the UE may perform beam measurements of one or more beams received from a base station (such as the base station 106 (FIG. 1)). The beam measurements may produce RSRP and/or SINR for each of the beams measured. The response from the beam measurements may be represented as $\gamma(w_1)$.

A probability of AoA as approximately a steering direction can be obtained from the RSRP and/or the SINR in 804, 806, and 808. In particular, the UE may determine a probability of the AoA as being approximately the steering direction $w_1$ in 804. Further, the UE may determine a probability of the AoA as being approximately the steering direction $w_2$ in 806. The UE may determine a probability of the AoA as being approximately the steering direction $w_3$ in 808. The probability may be determined based on a hard decision or a soft decision. In the hard decision, the probability may be determined by $$P(w_k) = \begin{cases} 1 & \gamma(w_k) = \max \gamma(w_i) \\ 0 & \text{otherwise} \end{cases}.$$

In the soft decision, the probability may be determined by $P(w_k) \propto \gamma(w_k)$.

For the approach, a probability of a steering direction may be spread across all mapped grids in 810, 812, 814, and 816. For example, the probability of a steering direction may be determined by $$P((\hat{\phi}, \hat{\theta}) = (\hat{\phi}_n, \hat{\theta}_n)) = \frac{P(w_k)}{|S_k|}$$

where $(\hat{\phi}_n, \hat{\theta}_n) \in \hat{S}_K$, where $P(w_k)$ is the probability that AoA is covered by the beam, $|S_k|$ is the cardinality of the subset $S_k$. In some other embodiments, the probability of a steering direction may be determined by $P((\hat{\phi}, \hat{\theta})=(\hat{\phi}_n, \hat{\theta}_n))=P(w_k)$. In particular, the UE may determine the probability of the steering direction $(\hat{\phi}_1, \hat{\theta}_1)$ in 810, the probability of the steering direction $(\hat{\phi}_2, \hat{\theta}_2)$ in 812, the probability of the steering direction $(\hat{\phi}_3, \hat{\theta}_3)$ in 814, and the probability of the steering direction $(\hat{\phi}_4, \hat{\theta}_4)$ in 816. If an AoA grid is mapped from more than 1 beam, then the probability of this grid is the sum probability over all source beams. The probability of the grid may be determined by $$P((\hat{\phi}, \hat{\theta}) = (\hat{\phi}_n, \hat{\theta}_n)) = \Sigma_{(\hat{\phi}_n, \hat{\theta}_n \in)} \frac{P(w_k)}{|S_k|}.$$

The sensor based AoA estimation can stop after M beam measurement opportunities with certain stop rules. For example, when if the UE remains in the sensor based AoA estimation state (such as the sensor based AoA estimation state 202 (FIG. 2)) after a certain amount of AoA estimates have been performed, the UE may transition from the sensor based AoA estimation state. The UE may transit to SENSOR_RELIABLE state and trigger sensor assisted beam tracking. In particular, based on the certain amount of AoA estimates having been performed while in the sensor based AoA estimation state, the UE may determine that a sensor reliable transition (such as the sensor reliable transition 208 (FIG. 2)) is to be implemented and the UE may transition to a sensor assisted beam tracking state (such as the sensor assisted beam tracking state 204 (FIG. 2)).

Stop criterion may include in a first instance if only 1 AoA grid has a sufficiently high probability then the highest probability AoA grids is utilized in the sensor assisted beam tracking state. In a second instance, the stop criterion may include if maximum number of beam measurements are performed, then multiple potential AoA grid points (for example, non-line-of-sign (NLOS) channels)) is utilized in the sensor assisted beam tracking state. The multiple potential AoA grid points may be determined by $$(\phi, \theta; t) = \begin{cases} (\phi_m, \theta_m; t) & \text{if } P((\phi_m, \theta_m)) > P_0, t < T_{max} \\ F(P(\phi_m, \theta_m), m = 1, \dots, M) & \text{if } t \geq T_{max} \end{cases},$$

where $(\phi_m, \theta_m; t)$ is a grid point that satisfies a threshold, and $F(P(\phi_m, \theta_m), m=1, \dots, M)$ is a function to map the set of the probability to an AoA. For example, if any of the stop criterion are met, the UE may transition to the sensor assisted beam tracking state with the value indicated.

If multiple potential AoAs have been observed in the end of window, it can be processed in various ways. In a first instance, the multiple potential AoAs can be processed by output of an average AoA per reliability (AoA expectation) for the AoA grid points with sufficient reliability, which may be defined by $F(P(\phi_m, \theta_m))$;

$$1 \leq m \leq M) = \frac{\Sigma_{m:P_m > P_1} P(\phi_m, \theta_m) \cdot (\phi_m, \theta_m)}{\Sigma_{m:P_m > P_1} P(\phi_m, \theta_m)}.$$

In a second instance, the multiple potential AoAs can be processed by output of multiple AoAs to the beam tracking engines and beam tracking engine can apply advanced beam selections.

Once stopped, the local AoA at the stopped time based on the stop criterion or the multiple potential AoAs may be converted to GCS and may remain constant until the AoA estimation is triggered again (such as SENSOR_LOCK state). For example, once the stopped, the local AoA estimate determined at the stop time may be converted to a global AoA estimate and may remain constant until the UE implements a sensor lock transition (such as the sensor lock transition 206 (FIG. 2)).

Below is provided an example algorithm that may be implemented for performance of one or more of the approaches described throughout the disclosure.

In an initialization portion of the algorithm, 2 AoA grid in LCS and GCS respectively. Note the size may not be the same. For example, a grid arrangement may be generated in the LCS and a grid arrangement may be generated in the GCS during the initialization. The grid arrangement in the LCS and the grid arrangement in the GCS may be different sizes in some embodiments. Codebook and beam-to-LCS AoA mapping (1:n). For example, codebook and beam-to-LCS AoA mapping may be defined in the initialization portion. The initialization portion may include:

Initialization:
Codebook $W=[w_1, w_2, \dots, w_K]$
LCS AoA grid $\hat{S} = \{(\hat{\phi}_1, \hat{\theta}_1), (\hat{\phi}_2, \hat{\theta}_2), \dots, (\hat{\phi}_N, \hat{\theta}_N)\}$
CB/AoA Mapping $f_k: W_K \mapsto \hat{S} = \{(\hat{\phi}_{k_1}, \hat{\theta}_{k_1}), (\hat{\phi}_{k_2}, \hat{\theta}_{k_2}), \dots\}$
GCS AoA grid $S = \{(\phi_1, \theta_1), (\phi_2, \theta_2), \dots, (\phi_m, \theta_m)\}$
LOCK=False for t=1 . . . T do
Input measure beam quality for each beam, $\gamma(w_K; t)$
Input sensor reading of LCS /GCS orientation rotation, $q^{(t)}$ Initialize instantaneous GCS AoA Prob $\tilde{P}_m=0$ for m=1, ..., M In a second portion of the algorithm, a probability of an GCS AoA based on beam measurement and LCS-to-GCS rotation at time t may be determined. The probability may be determined based on a hard decision or a soft decision. In the hard decision, $$g_k(\gamma(w_i;,t), i = 1, \ldots, K) = \begin{cases} 1 & \text{if } \gamma(w_k;t) = \max\gamma(w_i;t) \\ 0 & \text{otherwise} \end{cases}.$$

In the soft decision, $$g_k(\gamma(w_i;,t), i = 1, \ldots, K) = \frac{\gamma(w_k;t)}{\Sigma_i \gamma(w_i;t)}.$$

The second portion of the algorithm may include:

--- for n = 1 ... N do
   Calculate instantaneous prob of LCS AoA, $$\hat{P}_n = \sum_{(\hat{\phi}_n,\hat{\theta}_n)\in \hat{S}_k} \frac{1}{|\hat{S}_k|} g_k(\gamma(w_i; t), i = 1, \ldots, K)$$

Rotate LCS AoA quaternion to GCS, p(φ', θ') = $q^{(t)}$p($\hat{\phi}_n, \hat{\theta}_n$)$q^{(t)-1}$ Quantize to GCS grid, $(\phi_m, \theta_m)$ = $\underset{1 \le i \le M}{\text{argmax}} dist((\phi', \theta'), (\phi_i, \theta_i))$ Update instantaneous GCS AoA probability, $\tilde{P}_m \leftarrow \tilde{P}_m + \hat{P}_n$
end for

---

In a third portion of the algorithm, a probability of a GCS AoA over a time duration 1, 2, ..., t may be determined. The third portion of the algorithm may include:

--- for m = 1 ... M do

Initialize/update long term GCS AoA Prob, $P_m^{(t)} = \begin{cases} \tilde{P}_m & \text{if } t = 1 \\ P_m^{(t-1)} \cdot \tilde{P}_m & \text{if } t > 1 \end{cases}$ end for
for m = 1 ... M do Normalize long term GCS AoA Prob, $P_m^{(t)} \le \frac{P_m^{(t)}}{\sum_m P_m^{(t)}}$ end for

---

In a fourth portion of the algorithm, a termination criterion may be checked. The fourth portion of the algorithm may include:

--- if max $P_m^{(t)} \ge P_{reliable}$
     (φ*, θ*) = $(\phi_n, \theta_n)$
     LOCK = True
     break
   end if
end for

---

When codebook base beamforming is used, the beams in the codebook may be swept to measure the beam quality of each beam. Alternatively, a set of probing beams can be applied and the raw channel can be estimated utilizing the received signals of the probing beams. The channel estimates can be used for beam determination, such as channel based beamforming.

In such a case, a reference codebook can still be deployed for AoA estimation, where the quality of each beam in the codebook can be determined by applying the AoA beam on the channel estimates in baseband in some embodiments. In other embodiments, the quality of each beam in the codebook can be determined by correlating the channel based beam with the AoA beam.

Given the noisy measurement and other practical limitations, some AoA grid points may have unreliable probabilities. Example: Since human behavior has physical limitation, LCS AoA estimate change across time may have limitations and may not change dramatically. For example, LCS AoA estimations may be limited based on changes that would be impossible and/or unlikely for a UE being used by a human. Regularization rules can be applied to remove AoA outliers, either in local coordinate system or global coordinate system.

One or more optimal GCS AoA estimates can be output to sensor assisted beam tracking module to initialize the beam tracking. Multiple AoA estimates can be output in case of NLOS channel. This motivates the soft output for beam tracking module to leverage. Alternatively, the reliabilities of each AoA grid points can be output such that beam tracking can make reliability based decisions for beam sweeping or antenna probing.

The earlier sensor assisted beamforming framework may indicate two operating stages. AoA may be checked with new beam quality measurement for consistence. If an AoA estimation is detected to be unreliable, operation may switch back to AoA estimation (such as the sensor based AoA estimation state 202).

Alternatively, the joint sensor assisted beamforming and AoA estimate update can be applied after the initial AoA estimate has been estimated. Sensor reading and the current AoA estimate may be used to update beam between the beam measurement opportunities. Once beam qualities have been updated at a new measurement opportunity, AoA estimate can be updated directly without switching operation mode.

Figure 9A:
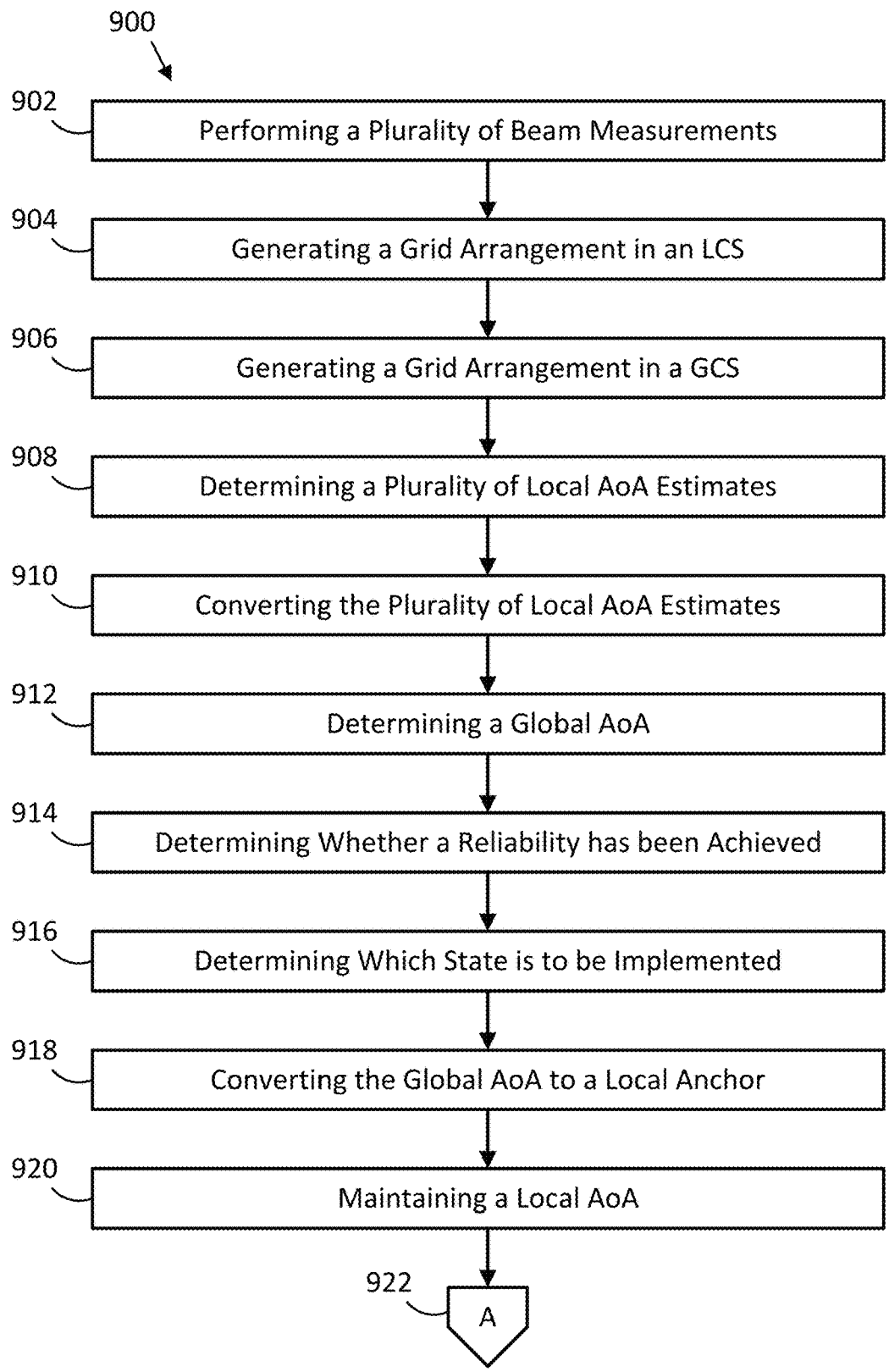
FIG. 9A illustrates a first portion of an example procedure for identifying a beam for communication in accordance with some embodiments.
Figure 9B:
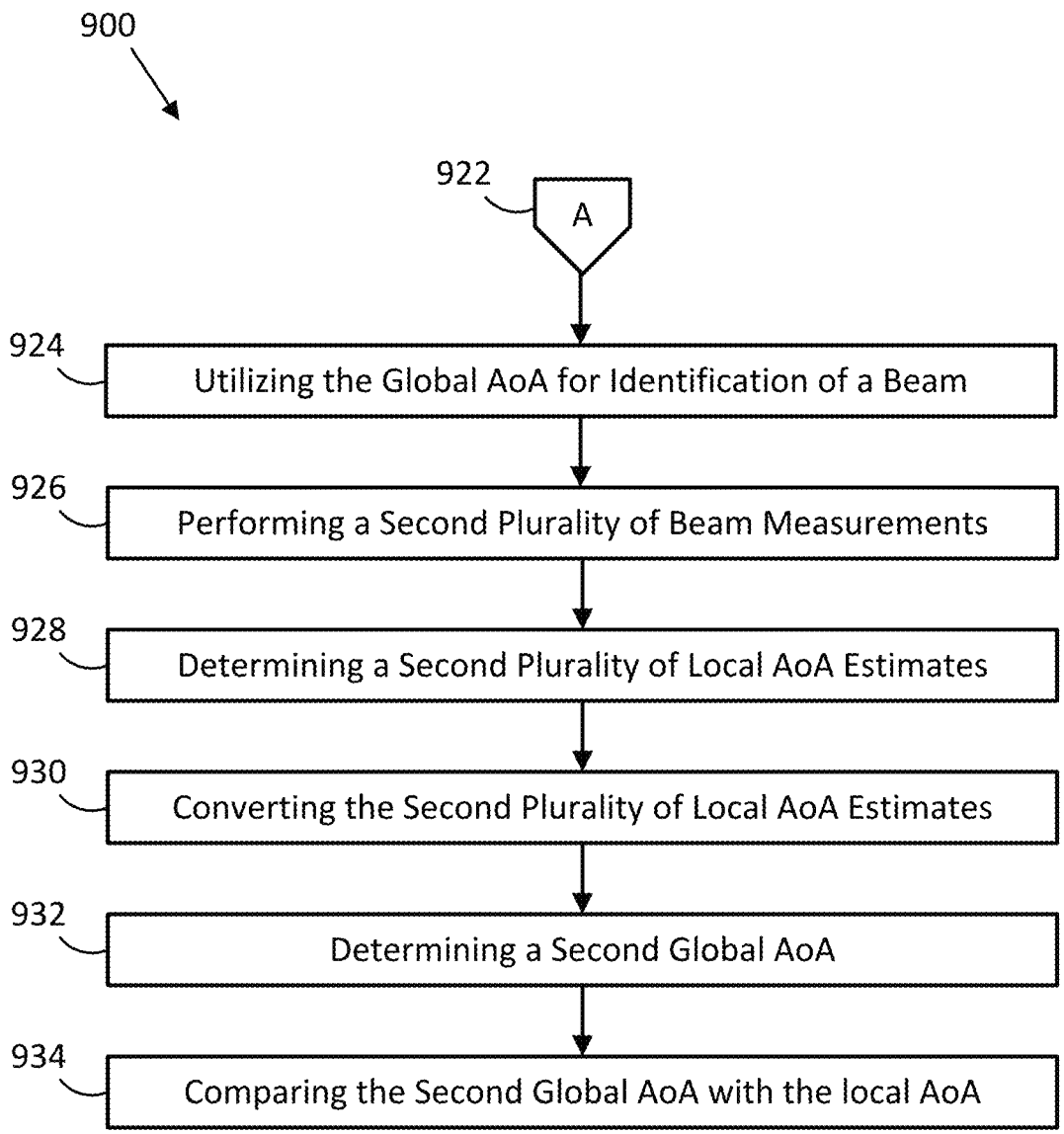
FIG. 9B illustrates a second portion of the example procedure for identifying a beam for communication in accordance with some embodiments.

FIG. 9A illustrates a first portion of an example procedure 900 for identifying a beam for communication in accordance with some embodiments. FIG. 9B illustrates a second portion of the example procedure 900 for identifying a beam for communication in accordance with some embodiments. The procedure 900 may be performed by a UE, such as the UE 102 (FIG. 1). The UE may perform the procedure 900 to determine a beam to be utilized for communication between a base station (such as the base station 106 (FIG. 1)) and the UE.

The procedure 900 may include performing a plurality of beam measurements in 902. In particular, the UE may perform a plurality of beam measurements corresponding to a beam received by the UE. The UE may receive the beam from the base station. The UE performing the plurality of beam measurements may produce RSRP and/or SINR for the beam.

The procedure 900 may further include generating a grid arrangement in an LCS in 904. In particular, the UE may generate a grid arrangement in an LCS. The UE may generate the grid arrangement in accordance with any of the approaches for generating a grid arrangement described throughout this disclosure. In some embodiments, 904 may be omitted.

The procedure 900 may further include generating a grid arrangement in a GCS in 906. In particular, the UE may generate a grid arrangement in a GCS. The UE may generate the gird arrangement in accordance with any of the approaches for generating a grid arrangement described throughout this disclosure. In some embodiments, 906 may be omitted.

The procedure 900 may include determining a plurality of local AoA estimates in 908. In particular, the UE may determine a plurality of local AoA estimates corresponding to the beam based on the plurality of beam measurements. The UE may determine the plurality of local AoA estimates in accordance with any of the approaches for determining a local AoA estimate described throughout this disclosure. In some embodiments, determining the plurality of local AoA estimates may include determining local grid positions for the plurality of local AoA estimates based on the plurality of beam measurements and the grid arrangement in the LCS as generated in 904. In some embodiments, some embodiments, the plurality of local AoA estimates may be established in a grid system for a LCS.

The procedure 900 may include converting the plurality of local AoA estimates in 910. In particular, the UE may convert the plurality of local AoA estimates to a plurality of global AoA estimates. The UE may convert the plurality of local AoA estimates to the plurality of global AoA estimates in accordance with any of the approaches for converting a local AoA estimate to a global AoA estimate described throughout this disclosure.

In some embodiments, converting the plurality of local AoA estimates to the plurality of global AoA estimates may include determining global grid positions for a plurality of global AoA estimates based on the local grid positions for the plurality of local AoA estimates.

In some embodiments, converting the plurality of local AoA estimates to the plurality of global AoA estimates may include converting the plurality of AoA estimates from a grid system for the LCS to a grid system for a GCS. For example, the UE may convert the plurality of AoA estimates from the grid system for the LCS to the grid system for the GCS when the local AoA estimates are established in the grid system for the LCS.

In some embodiments, converting the plurality of local AoA estimates to the plurality of global AoA estimates may include determining sensor data corresponding to each local AoA estimate of the plurality of AoA estimates. In particular, the UE may receive data from one or more sensor devices (such as the sensor devices 104 (FIG. 1)) to determine the sensor data. Further, the UE may convert the plurality of local AoA estimates to the plurality of global AoA estimates based on the sensor data corresponding to each local AoA estimate of the plurality of local AoA estimates.

The procedure 900 may include determining a global AoA in 912. In particular, the UE may determine a global AoA based on the plurality of global AoA estimates. The UE may determine the global AoA in accordance with any of the approaches of determining a global AoA described herein. In some embodiments, the global AoA may be an estimate of an actual global AoA that may be estimated based on the plurality of global AoA estimates. In some embodiments, the plurality of global AoA estimates may have a corresponding plurality of probabilities of being an actual global AoA.

In some embodiments, determining the global AoA may include converting a first set of local AoA estimates of the plurality of local AoA estimates to a first set of global AoA estimates of the plurality of global AoA estimates. The first set of local AoA estimates may correspond to a first time. Determining the global AoA may further include converting a second set of local AoA estimates of the plurality of local AoA estimates to a second set of global AoA estimates of the plurality of global AoA estimates. The second set of local AoA estimates may correspond to a second time. Further, determining the global AoA may include determining that the global AoA corresponds to a first global AoA estimate of the first set of global AoA estimates and a second global AoA estimate of the second set of global AoA estimates based on a determination that the first global AoA estimate overlaps with the second global AoA estimate.

In some embodiments, determining the global AoA may include determining a global AoA estimate with a greatest probability from the corresponding plurality of probabilities of the plurality of global AoA estimates. The UE may set the global AoA to the global AoA estimate with the greatest probability.

The procedure 900 may include determining whether a reliability has been achieved in 914. In particular, the UE may determine whether a reliability have been achieved for the global AoA based on a probability of the global AoA being an actual global AoA. The UE may determine whether the reliability has been achieved in accordance with any of the approaches for determining whether a reliability has been achieved described throughout this disclosure. In some embodiments, 914 may be omitted.

The procedure 900 may further include determining which state is to be implemented in 916. In particular, the UE may determine which of a sensor based AoA estimation state or a sensor assisted beam tracking state is to be implemented based on whether the reliability has been achieved. When the UE determines that the reliability is achieved, the UE may determine that the sensor assisted beam tracking state is to be implemented based on the reliability being achieved. When the UE determines that the reliability is not achieved, the UE may determine that the sensor based AoA estimate state is to be implemented based on the reliability not being achieved. In some embodiments, 916 may be omitted.

The procedure 900 may further include converting the global AoA to a local anchor in 918. In particular, the UE may convert the global AoA to a local anchor for use in the sensor assisted beam tracking state. In some embodiments, 918 may be omitted.

The procedure 900 may further include maintaining a local AoA in 920. In particular, the UE may maintain a local AoA based on the local anchor and sensor data from a sensor (such as the sensor devices 104) of the UE while the sensor assisted beam tracking state is implemented. In some embodiments, 920 may be omitted. 922 may illustrate the transition from FIG. 9A to FIG. 9B.

The procedure 900 may further include utilizing a global AoA for identification of a beam in 924. In particular, the UE may utilize the global AoA for identification of a beam received from the base station. The UE may determine that the beam is to utilized for communication between the UE and the base station. The UE may transmit an indication that the beam is to be utilized to the base station.

The procedure 900 may further include performing a second plurality of beam measurements in 926. In particular, the UE may perform a second plurality of beam measurements corresponding to the beam while the sensor assisted beam tracking state is implemented. In some embodiments, 926 may be omitted.

The procedure 900 may further include determining a second plurality of local AoA estimates in 928. In particular, the UE may determine a second plurality of local AoA estimates corresponding to the beam based on the second plurality of beam measurements from 926. In some embodiments, 928 may be omitted.

The procedure 900 may further include converting the second plurality of local AoA estimates in 930. In particular, the UE may convert the second plurality of local AoA estimates to a second plurality of global AoA estimates. In some embodiments, 930 may be omitted.

The procedure 900 may further include determining a second global AoA in 932. In particular, the UE may determine a second global AoA based on the second plurality of global AoA estimates. In some embodiments, 932 may be omitted.

The procedure 900 may further include comparing the second global with the local AoA in 934. In particular, the UE may compare the second global AoA with the local AoA being maintained in 920 to determine whether the local AoA has a reliability greater than a predetermined threshold. In some embodiments, 934 may be omitted.

Figure 10A:
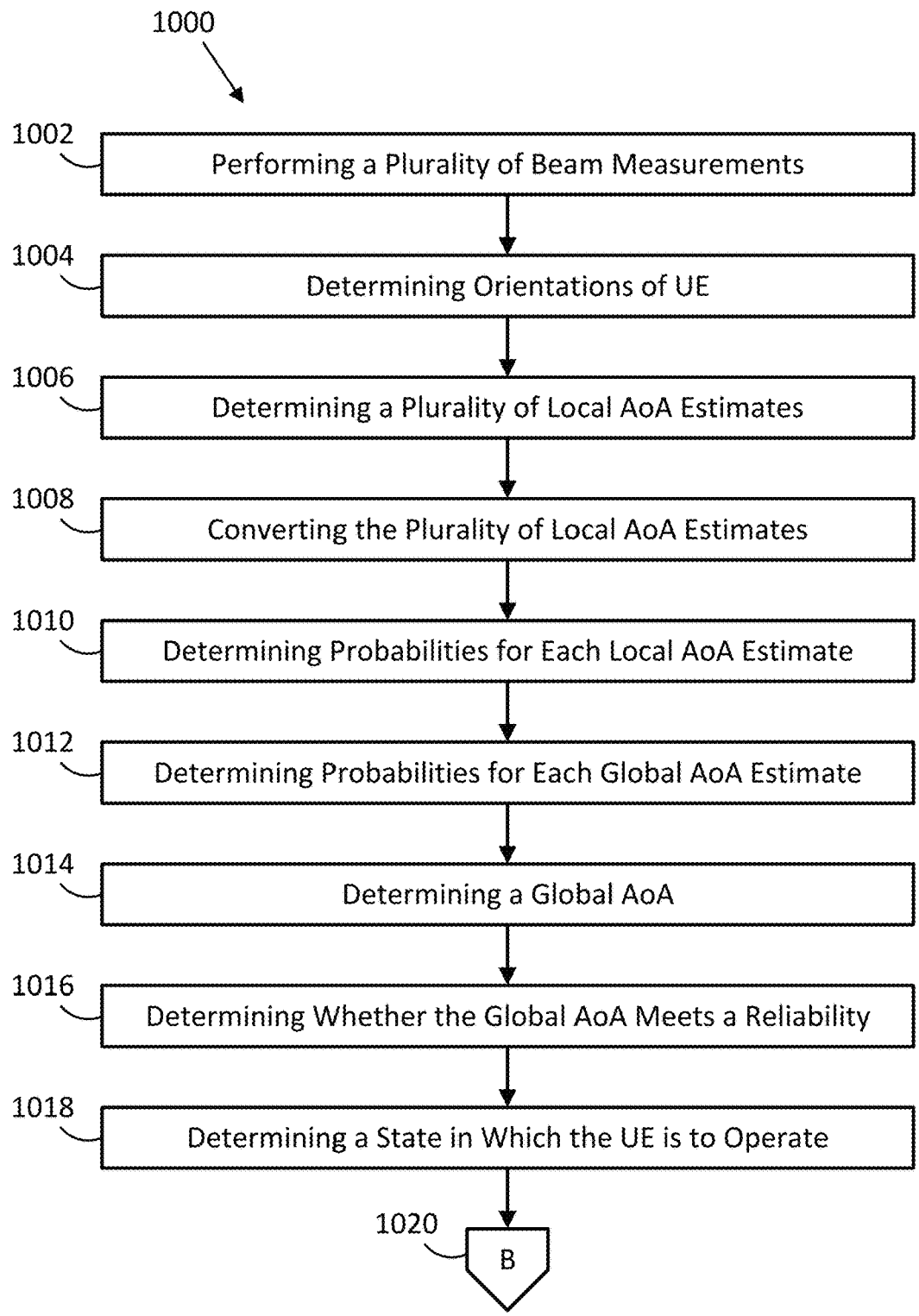
FIG. 10A illustrates a first portion of another example procedure for identifying a beam for communication in accordance with some embodiments.
Figure 10B:
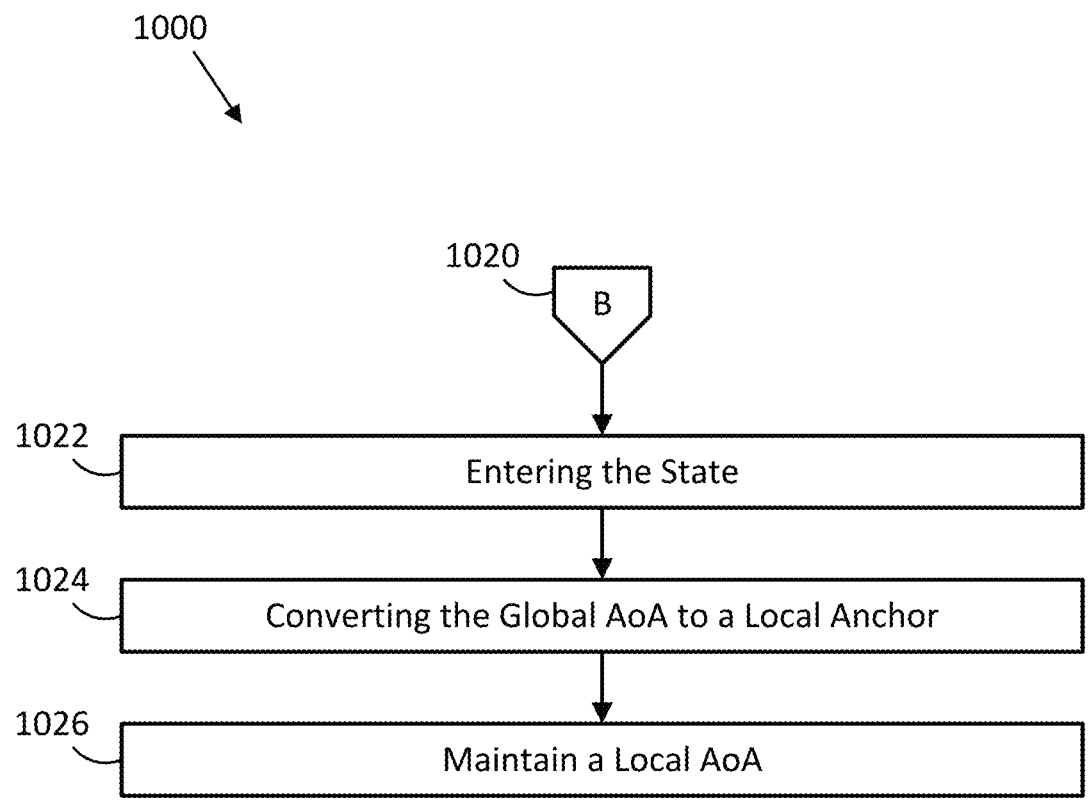
FIG. 10B illustrates a second portion of the example procedure for identifying a beam for communication in accordance with some embodiments.

FIG. 10A illustrates a first portion of another example procedure 1000 for identifying a beam for communication in accordance with some embodiments. FIG. 10B illustrates a second portion of the example procedure 1000 for identifying a beam for communication in accordance with some embodiments. The procedure 1000 may be performed by a UE, such as the UE 102 (FIG. 1). The UE may perform the procedure 1000 to determine a beam to be utilized for communication between a base station (such as the base station 106 (FIG. 1)) and the UE.

The procedure 1000 may include performing a plurality of beam measurements in 1002. In particular, the UE may perform a plurality of beam measurements corresponding to a beam received by the UE. The UE performing the plurality of beam measurements may produce RSRP and/or SINR for the beam.

The procedure 1000 may include determining orientations of the UE in 1004. In particular, the UE may determine orientations of the UE corresponding to each of the plurality of beam measurements. For example, the UE may receive sensor data from one or more sensors (such as the sensor devices 104 (FIG. 1)) and may determine orientations of the UE based on the sensor data.

The procedure 1000 may include determining a plurality of local AOA estimates in 1006. In particular, the UE may determine a plurality of local AOA estimates corresponding to the beam based on the plurality of beam measurements. The plurality of the local AoA estimates may be determined based on the beam measurements and/or the determined orientations from 1004.

The procedure 1000 may include converting the plurality of local AoA estimates in 1008. In particular, the UE may convert the plurality of local AoA estimates to a plurality of global AoA estimates based on the orientations of the UE corresponding to each of the plurality of beam measurements. In some embodiments, converting the plurality of local AoA estimates to the plurality of global AoA estimates may include converting the plurality of local AoA estimates from a LCS to a GCS to produce the plurality of global AoA estimates.

The procedure 1000 may include determining probabilities for each local AoA estimate in 1010. In particular, the UE may determine probabilities for each local AoA estimate of the plurality of local AoA estimates based on the plurality of beam measurements. In some embodiments, determining the probabilities for each local AoA estimate may include determining the probabilities for each local AoA estimate of the plurality of local AoA estimates based on RSRP and/or SINR for the plurality of local AoA estimates from the plurality of beam measurements. In some embodiments, 1010 may be omitted.

The procedure 1000 may include determining probabilities for each global AoA estimate in 1012. In particular, the UE may determine probabilities for each global AoA estimate of the plurality of global AoA estimates based on the probabilities for each local AoA estimate of the plurality of local AoA estimates. In some embodiments, 1012 may be omitted.

The procedure 1000 may include determining a global AoA in 1014. In particular, the UE may determine a global AoA based on overlap of the plurality of global AoA estimates. In some embodiments, the global AoA may be an estimate of an actual global AoA that may be estimated based on the plurality of global AoA estimates. In some embodiments, determining the global AoA may include determining that a probability for the global AoA is a largest probability of AoA estimates within a GCS based on the probabilities for each AoA of the plurality of global AoA estimates. In some embodiments, determining the global AoA may include determining a location of a greatest number of the plurality of global AoA estimates that overlap, where the global AoA is determined to be located at the location.

The procedure 1000 may include determining whether the global AoA meets a reliability in 1016. In particular, the UE may determine whether the global AoA meets a reliability based on the probability for the global AoA being greater than a predetermined threshold. In some embodiments, 1016 may be omitted.

The procedure 1000 may include determining a state in which the UE is to operate in 1018. In particular, the UE may determine whether the UE is to operate in a sensor based AoA estimation state or a sensor assisted beam tracking state based on whether the global AoA meets the reliability. For example, the UE may determine that the UE is to operate in the sensor based AoA estimation state based on the global AoA not meeting the reliability, and may determine that the UE is to operate in the sensor assisted beam tracking state based on the global AoA meeting the reliability. In some embodiments, 1018 may be omitted. 1020 may illustrate the transition from FIG. 10A to FIG. 10B.

The procedure 1000 may include entering the state in 1022. In particular, the UE may enter the state determined in 1018. For example, the UE may enter the sensor assisted beam tracking state based on a determination that the global AoA meets the reliability. Further, the UE may enter the sensor based AoA estimation state based on a determination that the global AoA fails to meet the reliability. In some embodiments, 1022 may be omitted.

The procedure 1000 may include converting the global AoA to a local anchor in 1024. In particular, the UE may convert the global AoA to a local anchor for utilization in the sensor assisted beam tracking state. In some embodiments, 1024 may be omitted.

The procedure 1000 may include maintaining a local AoA in 1026. In particular, the UE may maintain a local AoA based on the local anchor and sensor data related to a rotation of the UE. For example, the UE may receive sensor data from one or more sensors (such as the sensor device 104) and determine a rotation of the UE based on the sensor data. The UE may maintain the local AoA in a LCS based on the local anchor from 1024 and the data related to the rotation of the UE. In some embodiments, 1026 may be omitted.

Figure 11:
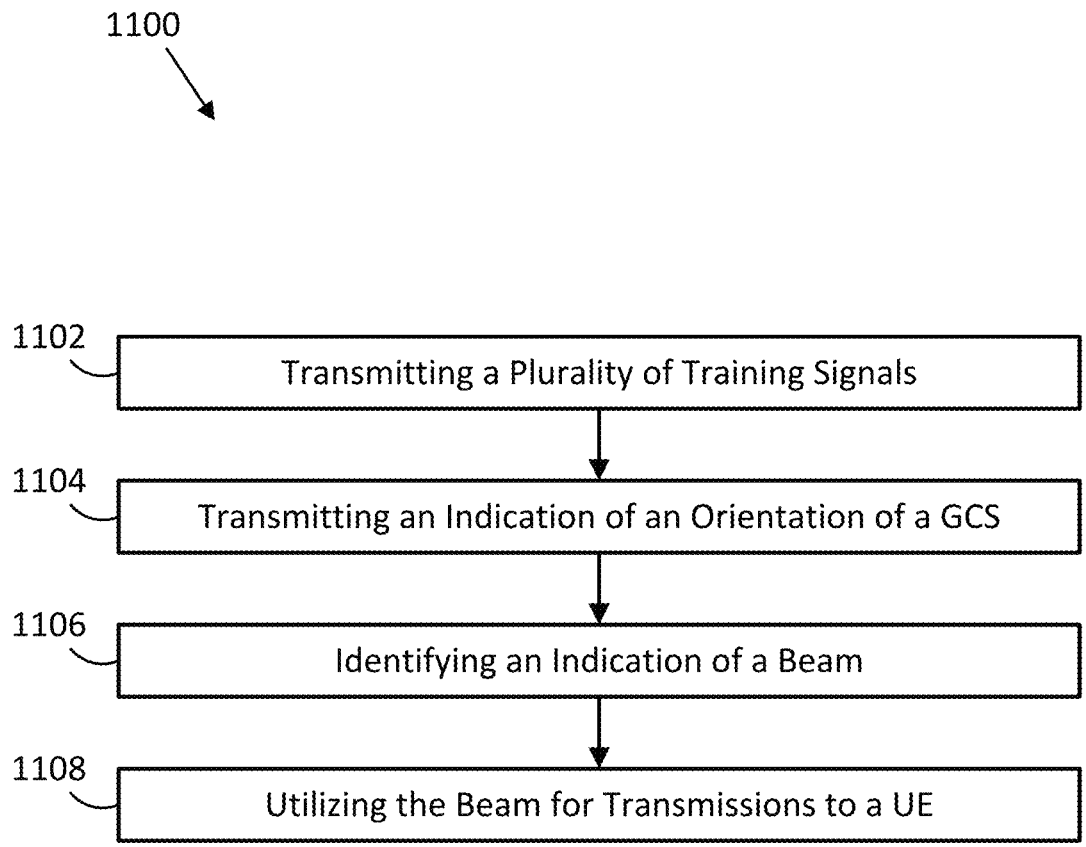
FIG. 11 illustrates an example procedure for determining a beam for communication in accordance with some embodiments.

FIG. 11 illustrates an example procedure 1100 for determining a beam for communication in accordance with some embodiments. The procedure 1100 may be performed by a base station, such as the base station 106 (FIG. 1). The base station may perform the procedure 1100 to determine a beam to be utilized for communication between the base station and a UE (such as the UE 102 (FIG. 1)).

The procedure 1100 may include transmitting a plurality of training signals in 1102. In particular, the base station may transmit a plurality of training signal to be utilized by the UE to determine a plurality of local AoA estimates for determination of a beam to be utilized for the UE. In some embodiments, transmitting the plurality of training signals includes transmitting the plurality of training signals via a sweeping approach or a probing approach.

The procedure 1100 may include transmitting an indication of an orientation of a GCS in 1104. In particular, the base station may transmit an indication of an orientation of a GCS to the UE, where the GCS may be utilized by the UE for determining the beam. For example, the UE may utilize the indication of the orientation of the GCS for generating the GCS, generating a grid assignment for the GCS, and/or generating a grid system for the GCS. In some embodiments, 1104 may be omitted.

The procedure 1100 may include identifying an indication of a beam in 1106. In particular, the base station may identify an indication, received from the UE, of the beam to be utilized for communication with the UE. The UE may have determined the beam based on a plurality of local AoA estimates determined from the plurality of training signals.

The procedure 1100 may include utilizing the beam for transmissions to the UE. In particular, the base station may utilize the beam for communicating with the UE.

Figure 12:
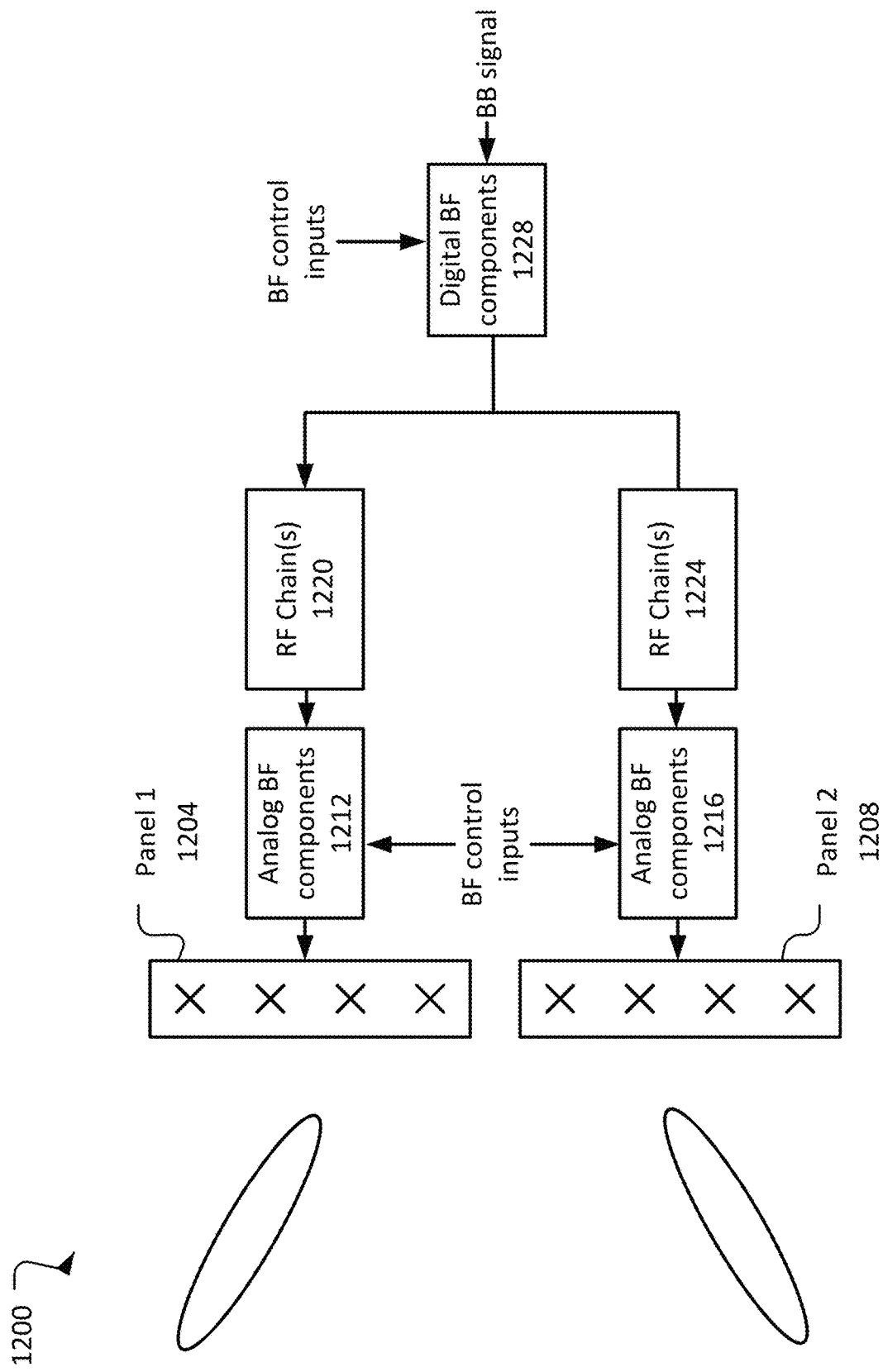
FIG. 12 illustrates example beamforming circuitry in accordance with some embodiments.

FIG. 12 illustrates example beamforming circuitry 1200 in accordance with some embodiments. The beamforming circuitry 1200 may include a first antenna panel, panel 1 1204, and a second antenna panel, panel 2 1208. Each antenna panel may include a number of antenna elements. Other embodiments may include other numbers of antenna panels.

Figure 13:
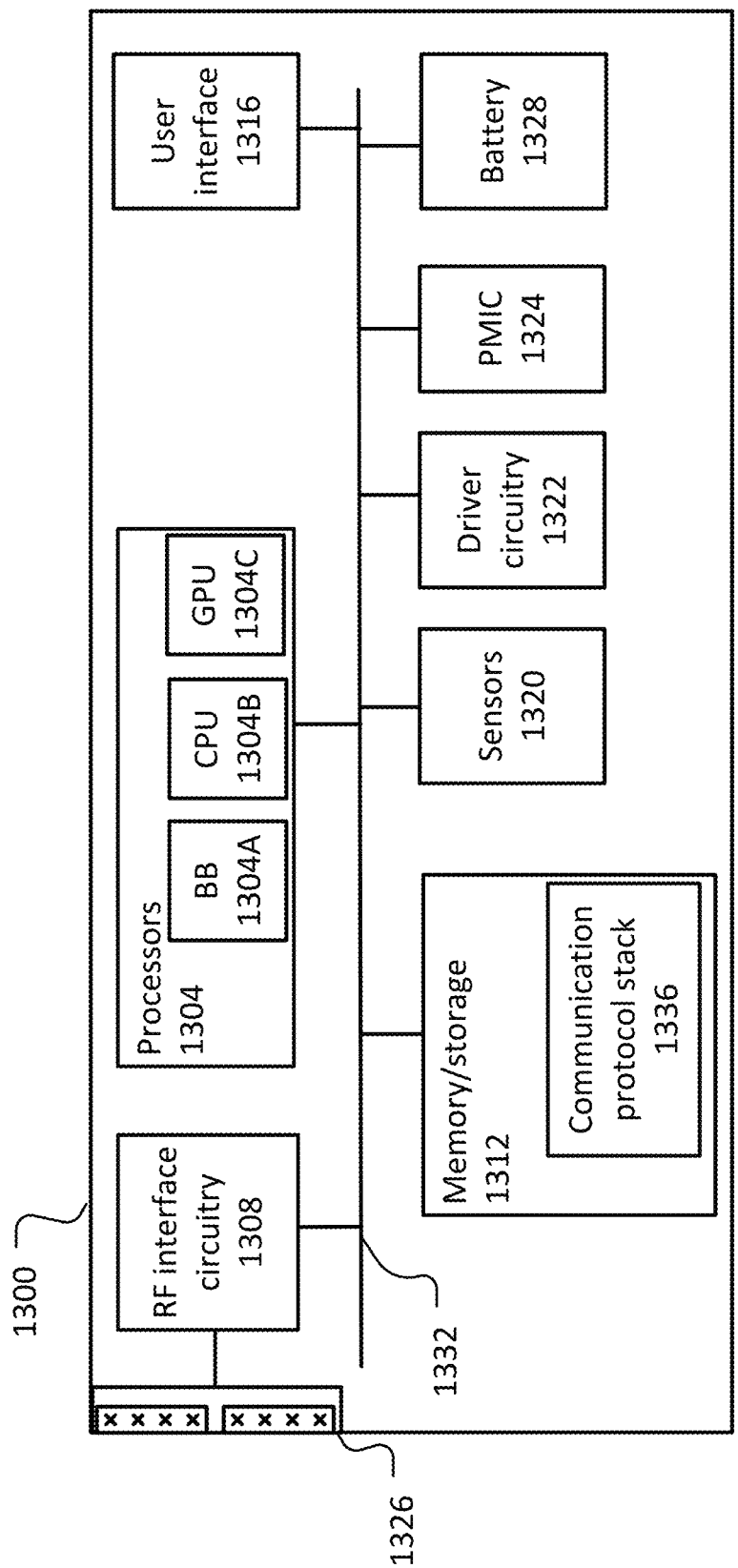
FIG. 13 illustrates an example user equipment (UE) in accordance with some embodiments.

Digital beamforming (BF) components 1228 may receive an input baseband (BB) signal from, for example, a baseband processor such as, for example, baseband processor 1304A of FIG. 13. The digital BF components 1228 may rely on complex weights to pre-code the BB signal and provide a beamformed BB signal to parallel radio frequency (RF) chains 1220/1224.

Each RF chain 1220/1224 may include a digital-to-analog converter to convert the BB signal into the analog domain; a mixer to mix the baseband signal to an RF signal; and a power amplifier to amplify the RF signal for transmission.

The RF signal may be provided to analog BF components 1212/1216, which may apply additionally beamforming by providing phase shifts in the analog domain. The RF signals may then be provided to antenna panels 1204/1208 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 13 illustrates an example UE 1300 in accordance with some embodiments. The UE 1300 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1300 may be a RedCap UE or NR-Light UE.

The UE 1300 may include processors 1304, RF interface circuitry 1308, memory/storage 1312, user interface 1316, sensors 1320, driver circuitry 1322, power management integrated circuit (PMIC) 1324, antenna structure 1326, and battery 1328. The components of the UE 1300 may be implemented as integrated circuits (ICs), portions thereof, discrete electronic devices, or other modules, logic, hardware, software, firmware, or a combination thereof. The block diagram of FIG. 13 is intended to show a high-level view of some of the components of the UE 1300. However, some of the components shown may be omitted, additional components may be present, and different arrangement of the components shown may occur in other implementations.

The components of the UE 1300 may be coupled with various other components over one or more interconnects 1332, which may represent any type of interface, input/output, bus (local, system, or expansion), transmission line, trace, optical connection, etc. that allows various circuit components (on common or different chips or chipsets) to interact with one another.

The processors 1304 may include processor circuitry such as, for example, baseband processor circuitry (BB) 1304A, central processor unit circuitry (CPU) 1304B, and graphics processor unit circuitry (GPU) 1304C. The processors 1304 may include any type of circuitry or processor circuitry that executes or otherwise operates computer-executable instructions, such as program code, software modules, or functional processes from memory/storage 1312 to cause the UE 1300 to perform operations as described herein.

In some embodiments, the baseband processor circuitry 1304A may access a communication protocol stack 1336 in the memory/storage 1312 to communicate over a 3GPP compatible network. In general, the baseband processor circuitry 1304A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1308.

The baseband processor circuitry 1304A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1312 may include one or more non-transitory, computer-readable media that includes instructions (for example, communication protocol stack 1336) that may be executed by one or more of the processors 1304 to cause the UE 1300 to perform various operations described herein. The memory/storage 1312 include any type of volatile or non-volatile memory that may be distributed throughout the UE 1300. In some embodiments, some of the memory/storage 1312 may be located on the processors 1304 themselves (for example, L1 and L2 cache), while other memory/storage 1312 is external to the processors 1304 but accessible thereto via a memory interface. The memory/storage 1312 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1308 may include transceiver circuitry and radio frequency front module (RFEM) that allows the UE 1300 to communicate with other devices over a radio access network. The RF interface circuitry 1308 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1326 and proceed to filter and amplify (with a low-noise amplifier) the signal. The signal may be provided to a receiver of the transceiver that down-converts the RF signal into a baseband signal that is provided to the baseband processor of the processors 1304.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1326.

In various embodiments, the RF interface circuitry 1308 may be configured to transmit/receive signals in a manner compatible with NR access technologies.

The antenna 1326 may include antenna elements to convert electrical signals into radio waves to travel through the air and to convert received radio waves into electrical signals. The antenna elements may be arranged into one or more antenna panels. The antenna 1326 may have antenna panels that are omnidirectional, directional, or a combination thereof to enable beamforming and multiple input, multiple output communications. The antenna 1326 may include microstrip antennas, printed antennas fabricated on the surface of one or more printed circuit boards, patch antennas, phased array antennas, etc. The antenna 1326 may have one or more panels designed for specific frequency bands including bands in FR1 or FR2.

In some embodiments, the UE 1300 may include the beamforming circuitry 1200 (FIG. 12), where the beamforming circuitry 1200 may be utilized for communication with the UE 1300. In some embodiments, components of the UE 1300 and the beamforming circuitry may be shared. For example, the antennas 1326 of the UE may include the panel 1 1204 and the panel 2 1208 of the beamforming circuitry 1200.

The user interface circuitry 1316 includes various input/output (I/O) devices designed to enable user interaction with the UE 1300. The user interface 1316 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1300.

The sensors 1320 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors;

barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1322 may include software and hardware elements that operate to control particular devices that are embedded in the UE 1300, attached to the UE 1300, or otherwise communicatively coupled with the UE 1300. The driver circuitry 1322 may include individual drivers allowing other components to interact with or control various input/output (I/O) devices that may be present within, or connected to, the UE 1300. For example, driver circuitry 1322 may include a display driver to control and allow access to a display device, a touchscreen driver to control and allow access to a touchscreen interface, sensor drivers to obtain sensor readings of sensor circuitry 1320 and control and allow access to sensor circuitry 1320, drivers to obtain actuator positions of electro-mechanic components or control and allow access to the electro-mechanic components, a camera driver to control and allow access to an embedded image capture device, audio drivers to control and allow access to one or more audio devices.

The PMIC 1324 may manage power provided to various components of the UE 1300. In particular, with respect to the processors 1304, the PMIC 1324 may control power-source selection, voltage scaling, battery charging, or DC-to-DC conversion.

In some embodiments, the PMIC 1324 may control, or otherwise be part of, various power saving mechanisms of the UE 1300. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1300 may power down for brief intervals of time and thus save power. If there is no data traffic activity for an extended period of time, then the UE 1300 may transition off to an RRC_Idle state, where it disconnects from the network and does not perform operations such as channel quality feedback, handover, etc. The UE 1300 goes into a very low power state and it performs paging where again it periodically wakes up to listen to the network and then powers down again. The UE 1300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1328 may power the UE 1300, although in some examples the UE 1300 may be mounted deployed in a fixed location, and may have a power supply coupled to an electrical grid. The battery 1328 may be a lithium ion battery, a metal-air battery, such as a zinc-air battery, an aluminum-air battery, a lithium-air battery, and the like. In some implementations, such as in vehicle-based applications, the battery 1328 may be a typical lead-acid automotive battery.

Figure 14:
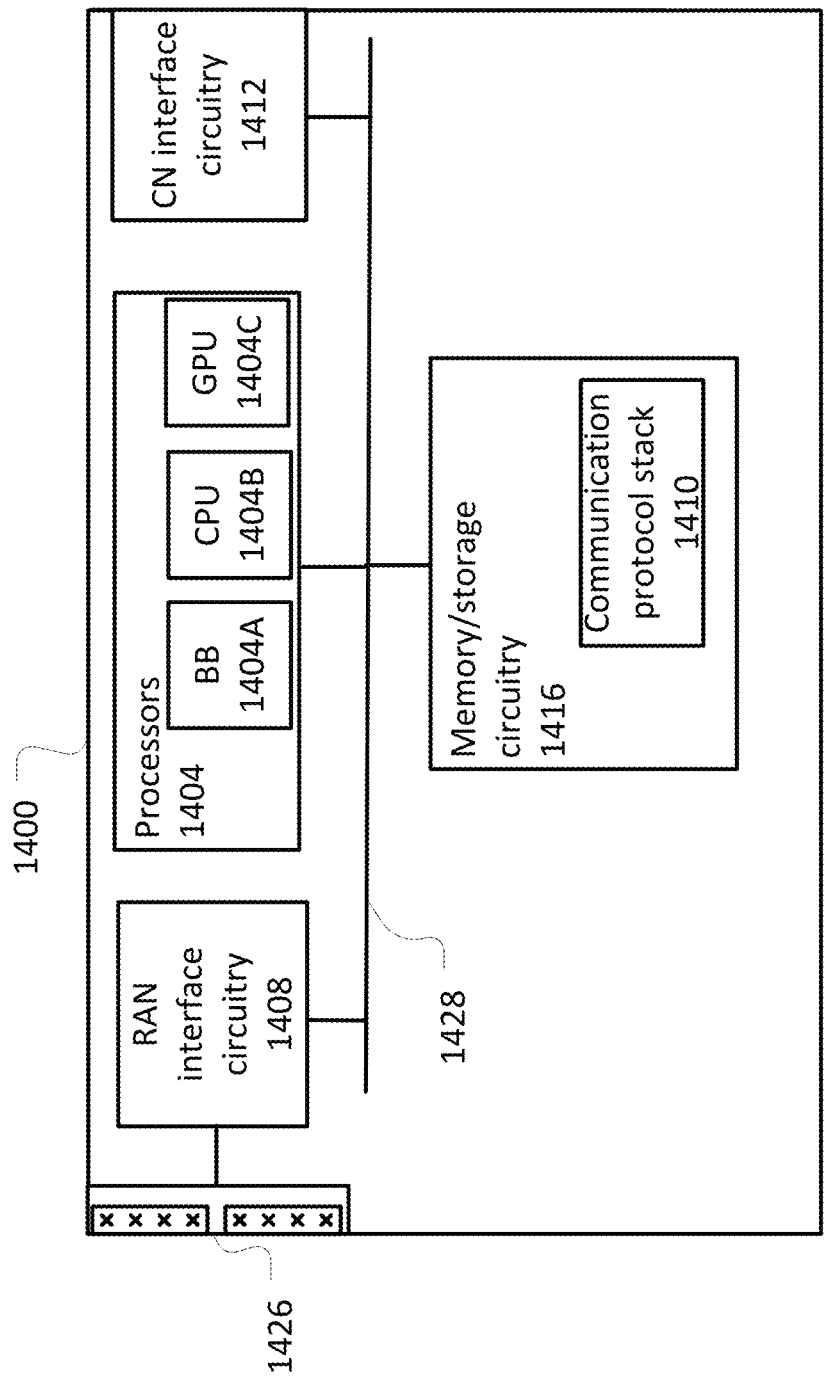
FIG. 14 illustrates an example next generation nodeB (gNB) in accordance with some embodiments.

FIG. 14 illustrates an example gNB 1400 in accordance with some embodiments. The gNB 1400 may include processors 1404, RF interface circuitry 1408, core network (CN) interface circuitry 1412, memory/storage circuitry 1416, and antenna structure 1426.

The components of the gNB 1400 may be coupled with various other components over one or more interconnects 1428.

The processors 1404, RF interface circuitry 1408, memory/storage circuitry 1416 (including communication protocol stack 1410), antenna structure 1426, and interconnects 1428 may be similar to like-named elements shown and described with respect to FIG. 13.

The CN interface circuitry 1412 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1400 via a fiber optic or wireless backhaul. The CN interface circuitry 1412 may include one or more dedicated processors or FPGAs to communicate using one or more of the aforementioned protocols. In some implementations, the CN interface circuitry 1412 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method, comprising performing a plurality of beam measurements corresponding to a beam received by the UE determining a plurality of local angle of arrival (AoA) estimates corresponding to the beam based on the plurality of beam measurements, converting the plurality of local AoA estimates to a plurality of global AoA estimates, determining a global AoA based on the plurality of global AoA estimates, and utilizing the global AoA for identification of a beam received from a base station.

Example 2 may include the method of example 1, wherein determining the global AoA includes converting a first set of local AoA estimates of the plurality of local AoA estimates to a first set of global AoA estimates of the plurality of global AoA estimates, the first set of local AoA estimates to correspond to a first time, converting a second set of local AoA estimates of the plurality of local AoA estimates to a second set of global AoA estimates of the plurality of global AoA estimates, the second set of local AoA estimates to correspond to a second time, and determining that the global AoA corresponds to a first global AoA estimate of the first set of global AoA estimates and a second global AoA estimate of the second set of global AoA estimates based on a determination that the first global AoA estimate overlaps with the second global AoA estimate.

Example 3 may include the method of example 1, wherein the plurality of global AoA estimates have a corresponding plurality of probabilities of being an actual global AoA, and wherein determining the global AoA includes determining a global AoA estimate with a greatest probability from the corresponding plurality of probabilities of the plurality of global AoA estimates, and setting the global AoA to the global AoA estimate with the greatest probability.

Example 4 may include the method of example 1, further comprising determining whether a reliability has been achieved for the global AoA based on a probability of the global AoA being an actual global AoA, and determining which of a sensor based AoA estimation state or a sensor assisted beam tracking state is to be implemented based on whether the reliability has been achieved.

Example 5 may include the method of example 4, wherein the method includes determining that the reliability has been achieved, wherein the sensor assisted beam tracking state is to be implemented based on the reliability being achieved, and the method further includes converting the global AoA to a local anchor, and maintaining a local AoA based on the local anchor and sensor data from a sensor of the UE while the sensor assisted beam tracking state is implemented.

Example 6 may include the method of example 5, wherein the plurality of beam measurements is a first plurality of beam measurements, wherein the plurality of local AoA estimates are a first plurality of local AoA estimates, wherein the plurality of global AoA estimates are a first plurality of global AoA estimates, wherein the global AoA is a first global AoA, and wherein the method further comprises performing a second plurality of beam measurements corresponding to the beam while the sensor assisted beam tracking state is implemented, determining a second plurality of local AoA estimates corresponding to the beam based on the second plurality of beam measurements, converting the second plurality of local AoA estimates to a second plurality of global AoA estimates, determining a second global AoA based on the second plurality of global AoA estimates, and comparing the second global AoA with the local AoA to determine whether the local AoA has a reliability greater than a predetermined threshold.

Example 7 may include the method of example 1, further comprising generating a grid arrangement in a local coordinate system (LCS), wherein determining the plurality of local AoA estimates includes determining local grid positions for the plurality of local AoA estimates based on the plurality of beam measurements and the grid arrangement in the LCS, and generating a grid arrangement in a global coordinate system (GCS), wherein converting the plurality of local AoA estimates to the plurality of global AoA estimates includes determining global grid positions for the plurality of global AoA estimates based on the local grid positions for the plurality of local AoA estimates.

Example 8 may include the method of example 1, wherein the plurality of local AoA estimates are established in a grid system for a local coordinate system (LCS), and wherein converting the plurality of local AoA estimates to the plurality of global AoA estimates includes converting the plurality of local AoA estimates from the grid system for the LCS to a grid system for a global coordinate system (GCS).

Example 9 may include the method of example 1, wherein converting the plurality of local AoA estimates to the plurality of global AoA estimates includes determining sensor data corresponding to each local AoA estimate of the plurality of local AoA estimates, and converting the plurality of local AoA estimates to the plurality of global AoA estimates based on the sensor data corresponding to each local AoA estimate of the plurality of local AoA estimates.

Example 10 may include a method, comprising performing a plurality of beam measurements corresponding to a beam received by a UE, determining orientations of the UE corresponding to each of the plurality of beam measurements, determining a plurality of local angle of arrival (AoA) estimates corresponding to the beam based on the plurality of beam measurements, converting the plurality of local AoA estimates to a plurality of global AoA estimates based on the orientations of the UE corresponding to each of the plurality of beam measurements, and determining a global AoA based on overlap of the plurality of global AoA estimates.

Example 11 may include the method of example 10, further comprising determining probabilities for each local AoA estimate of the plurality of local AoA estimates based on the plurality of beam measurements, and determining probabilities for each global AoA estimate of the plurality of global AoA estimates based on the probabilities for each local AoA estimate of the plurality of local AoA estimates, wherein determining the global AoA includes determining that a probability for the global AoA is a largest probability of AoA estimates within a global coordinate system (GCS) based on the probabilities for each global AoA estimate of the plurality of global AoA estimates.

Example 12 may include the method example 11, wherein determining the probabilities for each local AoA estimate of the plurality of local AoA estimates includes determining the probabilities for each local AoA estimate of the plurality of local AoA estimates based on reference signal received power (RSRP) or signal to interference and noise ratio (SINR) for the plurality of local AoA estimates from the plurality of beam measurements.

Example 13 may include the method of example 11, further comprising determining whether the global AoA meets a reliability based on the probability for the global AoA being greater than a predetermined threshold, and determining whether the UE is to operate in a sensor based AoA estimation state or a sensor assisted beam tracking state based on whether the global AoA meets the reliability.

Example 14 may include the method of example 13, further comprising entering the sensor assisted beam tracking state based on a determination that the global AoA meets the reliability, converting the global AoA to a local anchor, and maintaining a local AoA based on the local anchor and sensor data related to the rotation of the UE.

Example 15 may include the method of example 13, further comprising entering the sensor based AoA estimation state based on a determination that the global AoA fails to meet the reliability.

Example 16 may include the method of example 10, wherein determining the global AoA includes determining a position of a greatest number of the plurality of global AoA estimates that overlap, wherein the global AoA is determined to be located at the position.

Example 17 may include the method example 10, wherein converting the plurality of local AoA estimates to the plurality of global AoA estimates includes converting the plurality of local AoA estimates from a local coordinate system (LCS) to a global coordinate system (GCS) to produce the plurality of global AoA estimates.

Example 18 may include a method for angle of arrival (AoA) determination, comprising transmitting, by a base station, a plurality of training signals to be utilized by a user equipment (UE) to determine a plurality of local AoA estimates for determination of a beam to be utilized for the UE, identifying, by the base station received from the UE, an indication of the beam to be utilized for communication with the UE, the beam determined based on the plurality of local AoA estimates determined from the plurality of training signals, and utilizing, by the base station, the beam for transmissions to the UE.

Example 19 may include the method of example 18, further comprising transmitting, by the base station, an indication of an orientation of a global coordinate system (GCS) to the UE, the GCS to be utilized by the UE for determining the beam.

Example 20 may include the method of example 18, wherein transmitting the plurality of training signals includes transmitting the plurality of training signals via a sweeping approach or a probing approach.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors, cause a user equipment (UE) to:
    perform a plurality of beam measurements corresponding to a beam received by the UE;
    determine a plurality of local angle of arrival (AoA) estimates corresponding to the beam based on the plurality of beam measurements;
    convert the plurality of local AoA estimates to a plurality of global AoA estimates;
    determine a global AoA based on the plurality of global AoA estimates;
    utilize the global AoA for identification of a beam received from a base station;
    determine whether a reliability threshold has been achieved for the global AoA based on a probability of the global AoA being an actual global AoA; and
    determine which of a sensor based AoA estimation state or a sensor assisted beam tracking state is to be implemented based on whether the reliability threshold has been achieved.

2. The one or more non-transitory computer-readable media of claim 1, wherein to determine the global AoA includes to:
    convert a first set of local AoA estimates of the plurality of local AoA estimates to a first set of global AoA estimates of the plurality of global AoA estimates, the first set of local AoA estimates to correspond to a first time;
    convert a second set of local AoA estimates of the plurality of local AoA estimates to a second set of global AoA estimates of the plurality of global AoA estimates, the second set of local AoA estimates to correspond to a second time; and
    determine that the global AoA corresponds to a first global AoA estimate of the first set of global AoA estimates and a second global AoA estimate of the second set of global AoA estimates based on a determination that the first global AoA estimate overlaps with the second global AoA estimate.

3. The one or more non-transitory computer-readable media of claim 1, wherein the plurality of global AoA estimates have a corresponding plurality of probabilities of being an actual global AoA, and wherein to determine the global AoA includes to:
    determine a global AoA estimate with a greatest probability from the corresponding plurality of probabilities of the plurality of global AoA estimates; and
    set the global AoA to the global AoA estimate with the greatest probability.

4. The one or more non-transitory computer-readable media of claim 1, wherein the UE is to determine that the reliability has been achieved, wherein the sensor assisted beam tracking state is to be implemented based on the reliability being achieved, and wherein the instructions, when executed by the one or more processors, are further to:
    convert the global AoA to a local anchor; and
    maintain a local AoA based on the local anchor and sensor data from a sensor of the UE while the sensor assisted beam tracking state is implemented.

5. The one or more non-transitory computer-readable media of claim 4, wherein the plurality of beam measurements is a first plurality of beam measurements, wherein the plurality of local AoA estimates are a first plurality of local AoA estimates, wherein the plurality of global AoA estimates are a first plurality of global AoA estimates, wherein the global AoA is a first global AoA, and wherein the instructions, when executed by the one or more processors, are further to cause the UE to:
    perform a second plurality of beam measurements corresponding to the beam while the sensor assisted beam tracking state is implemented;
    determine a second plurality of local AoA estimates corresponding to the beam based on the second plurality of beam measurements;
    convert the second plurality of local AoA estimates to a second plurality of global AoA estimates;
    determine a second global AoA based on the second plurality of global AoA estimates; and compare the second global AoA with the local AoA to determine whether the local AoA has a reliability greater than a predetermined threshold.

6. The one or more non-transitory computer-readable media of claim 1, wherein the instructions, when executed by the one or more processors, further cause the UE to:
generate a grid arrangement in a local coordinate system (LCS), wherein to determine the plurality of local AoA estimates includes to determine local grid positions for the plurality of local AoA estimates based on the plurality of beam measurements and the grid arrangement in the LCS; and
generate a grid arrangement in a global coordinate system (GCS), wherein to convert the plurality of local AoA estimates to the plurality of global AoA estimates includes to determine global grid positions for the plurality of global AoA estimates based on the local grid positions for the plurality of local AoA estimates.

7. The one or more non-transitory computer-readable media of claim 1, wherein the plurality of local AoA estimates are established in a grid system for a local coordinate system (LCS), and wherein to convert the plurality of local AoA estimates to the plurality of global AoA estimates includes to convert the plurality of local AoA estimates from the grid system for the LCS to a grid system for a global coordinate system (GCS).

8. The one or more non-transitory computer-readable media of claim 1, wherein to convert the plurality of local AoA estimates to the plurality of global AoA estimates includes to:
determine sensor data corresponding to each local AoA estimate of the plurality of local AoA estimates; and
convert the plurality of local AoA estimates to the plurality of global AoA estimates based on the sensor data corresponding to each local AoA estimate of the plurality of local AoA estimates.

9. A user equipment (UE) comprising:
a sensor to determine a rotation of the UE; and
processing circuitry coupled to the sensor, the processing circuitry to:
perform a plurality of beam measurements corresponding to a beam received by the UE;
determine orientations of the UE corresponding to each of the plurality of beam measurements;
determine a plurality of local angle of arrival (AoA) estimates corresponding to the beam based on the plurality of beam measurements;
convert the plurality of local AoA estimates to a plurality of global AoA estimates based on the orientations of the UE corresponding to each of the plurality of beam measurements;
determine a global AoA based on overlap of the plurality of global AoA estimates;
determine whether the global AoA meets a reliability threshold based on the probability for the global AoA being greater than a predetermined threshold; and
determine whether the UE is to operate in a sensor based AoA estimation state or a sensor assisted beam tracking state based on whether the global AoA meets the reliability threshold.

10. The UE of claim 9, wherein the processing circuitry is further to:
determine probabilities for each local AoA estimate of the plurality of local AoA estimates based on the plurality of beam measurements; and
determine probabilities for each global AoA estimate of the plurality of global AoA estimates based on the probabilities for each local AoA estimate of the plurality of local AoA estimates, wherein to determine the global AoA includes to determine that a probability for the global AoA is a largest probability of AoA estimates within a global coordinate system (GCS) based on the probabilities for each global AoA estimate of the plurality of global AoA estimates.

11. The UE of claim 10, wherein to determine the probabilities for each local AoA estimate of the plurality of local AoA estimates includes to determine the probabilities for each local AoA estimate of the plurality of local AoA estimates based on reference signal received power (RSRP) or signal to interference and noise ratio (SINR) for the plurality of local AoA estimates from the plurality of beam measurements.

12. The UE of claim 9, wherein the processing circuitry is further to:
enter the sensor assisted beam tracking state based on a determination that the global AoA meets the reliability;
convert the global AoA to a local anchor; and
maintain a local AoA based on the local anchor and sensor data related to the rotation of the UE.

13. The UE of claim 9, wherein the processing circuitry is further to enter the sensor based AoA estimation state based on a determination that the global AoA fails to meet the reliability.

14. The UE of claim 9, wherein to determine the global AoA includes to determine a position of a greatest number of the plurality of global AoA estimates that overlap, wherein the global AoA is determined to be located at the position.

15. The UE of claim 9, wherein to convert the plurality of local AoA estimates to the plurality of global AoA estimates includes to convert the plurality of local AoA estimates from a local coordinate system (LCS) to a global coordinate system (GCS) to produce the plurality of global AoA estimates.

16. A method for angle of arrival (AoA) determination, comprising:
transmitting, by a base station, an indication of an orientation of a global coordinate system (GCS) to a user equipment (UE), the GCS to be utilized by the UE for determining a beam to be utilized for communication with the UE;
transmitting, by the base station, a plurality of training signals to be utilized by the UE to determine a plurality of local AoA estimates for determination of a beam to be utilized for communication with the UE;
identifying, by the base station received from the UE, an indication of the beam to be utilized for communication with the UE, the beam determined based on the plurality of local AoA estimates determined from the plurality of training signals; and
utilizing, by the base station, the beam for transmissions to the UE.

17. The method of claim 16, wherein transmitting the plurality of training signals includes transmitting the plurality of training signals via a sweeping approach or a probing approach.

* * * * *